(12) United States Patent
Votaw et al.

(10) Patent No.: US 10,158,628 B2
(45) Date of Patent: Dec. 18, 2018

(54) PREVENTING UNAUTHORIZED ACCESS TO SECURED INFORMATION SYSTEMS BASED ON CONTEXTUAL LOGIN INFORMATION

(71) Applicant: Bank of America Corporation, Charlotte, NC (US)

(72) Inventors: Elizabeth S. Votaw, Potomac, MD (US); Andrew T. Keys, Albany, OR (US)

(73) Assignee: Bank of America Corporation, Charlotte, NC (US)

( * ) Notice: Subject to any disclaimer, the term of this patent is extended or adjusted under 35 U.S.C. 154(b) by 282 days.

(21) Appl. No.: 15/176,956

(22) Filed: Jun. 8, 2016

(65) Prior Publication Data

US 2017/0359336 A1 Dec. 14, 2017

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ...... *H04L 63/0838* (2013.01); *H04L 63/0861* (2013.01); *H04L 63/123* (2013.01)

(58) Field of Classification Search
CPC . H04L 63/0838; H04L 63/0853; H04L 63/10; H04L 63/18; H04L 63/08
See application file for complete search history.

(56) References Cited

U.S. PATENT DOCUMENTS

| | | | | |
|---|---|---|---|---|
| 2007/0060284 | A1* | 3/2007 | Yacenda | G07F 17/32 463/17 |
| 2008/0162338 | A1* | 7/2008 | Samuels | G06F 21/40 705/38 |
| 2009/0259848 | A1* | 10/2009 | Williams | H04L 63/0838 713/168 |
| 2012/0191621 | A1* | 7/2012 | Williams | G06Q 50/265 705/325 |
| 2016/0112410 | A1 | 4/2016 | Nedeltchev et al. | |
| 2016/0112412 | A1 | 4/2016 | Roth et al. | |
| 2016/0112430 | A1 | 4/2016 | Geller | |
| 2016/0112437 | A1 | 4/2016 | Churyumov | |
| 2016/0112497 | A1 | 4/2016 | Koushik et al. | |

(Continued)

*Primary Examiner* — Trong H Nguyen
(74) *Attorney, Agent, or Firm* — Banner & Witcoff, Ltd.; Michael A. Springs

(57) ABSTRACT

A computing platform may receive, from a client server, a request to authenticate a user to a user account, as well as device selection input selecting a registered device to receive a one-time passcode. The computing platform may evaluate the device selection input based on contextual login information associated with the user account, determine that the registered device selected to receive the one-time passcode is out of context, and execute a security procedure. Based on validating a response to the security procedure, the computing platform may generate a one-time passcode and may send the one-time passcode to the registered device selected to receive the one-time passcode. Thereafter, the computing platform may receive one-time passcode input, validate the one-time passcode input, generate a validation message directing the client server to provide the user with access to the user account, and send the validation message to the client server.

22 Claims, 17 Drawing Sheets

(56) References Cited

U.S. PATENT DOCUMENTS

| | | |
|---|---|---|
| 2016/0112872 A1 | 4/2016 | McClement et al. |
| 2016/0117697 A1 | 4/2016 | Briere et al. |
| 2016/0119379 A1 | 4/2016 | Nadkarni |
| 2016/0119746 A1 | 4/2016 | Moldavsky et al. |
| 2016/0119749 A1 | 4/2016 | Moldavsky et al. |
| 2016/0119750 A1 | 4/2016 | Moldavsky et al. |
| 2016/0119771 A1 | 4/2016 | Moldavsky et al. |
| 2016/0124742 A1 | 5/2016 | Rangasamy et al. |
| 2016/0125184 A1 | 5/2016 | Mahaffey et al. |
| 2016/0125358 A1 | 5/2016 | Kushner et al. |
| 2016/0125386 A1 | 5/2016 | Desai et al. |
| 2016/0125394 A1 | 5/2016 | Desai et al. |
| 2016/0125408 A1 | 5/2016 | Crawford |
| 2016/0125414 A1 | 5/2016 | Desai et al. |
| 2016/0127254 A1 | 5/2016 | Kumar et al. |
| 2016/0127324 A1 | 5/2016 | Ferdinand |
| 2016/0127454 A1 | 5/2016 | Maheshwari et al. |
| 2016/0127539 A1 | 5/2016 | Sharma |
| 2016/0127540 A1 | 5/2016 | Sharma et al. |
| 2016/0127541 A1 | 5/2016 | Sharma |
| 2016/0127548 A1 | 5/2016 | Sharma |
| 2016/0127549 A1 | 5/2016 | Sharma |
| 2016/0127562 A1 | 5/2016 | Chauhan |
| 2016/0127566 A1 | 5/2016 | Sharma et al. |
| 2016/0127567 A1 | 5/2016 | Kimmel |
| 2016/0127569 A1 | 5/2016 | Kamas et al. |
| 2016/0127797 A1 | 5/2016 | Ellis et al. |
| 2016/0127808 A1 | 5/2016 | Wong et al. |
| 2016/0132221 A1 | 5/2016 | Lasser et al. |
| 2016/0132401 A1 | 5/2016 | O'Hare et al. |
| 2016/0132585 A1 | 5/2016 | Aasen et al. |
| 2016/0134599 A1 | 5/2016 | Ross et al. |
| 2016/0134634 A1 | 5/2016 | Rosendal et al. |
| 2016/0140329 A1 | 5/2016 | Boivie |
| 2016/0140582 A1 | 5/2016 | Steele et al. |
| 2016/0147952 A1 | 5/2016 | Garcia et al. |
| 2016/0148597 A1 | 5/2016 | Hamid et al. |
| 2016/0149705 A1 | 5/2016 | Bobinski et al. |
| 2016/0149843 A1 | 5/2016 | Spicer et al. |
| 2016/0149893 A1 | 5/2016 | Perrot |
| 2016/0150078 A1 | 5/2016 | Joshi et al. |
| 2016/0155195 A1 | 6/2016 | Imrey |
| 2016/0156627 A1 | 6/2016 | Wallaja |
| 2016/0156666 A1 | 6/2016 | Rajagopal et al. |

\* cited by examiner

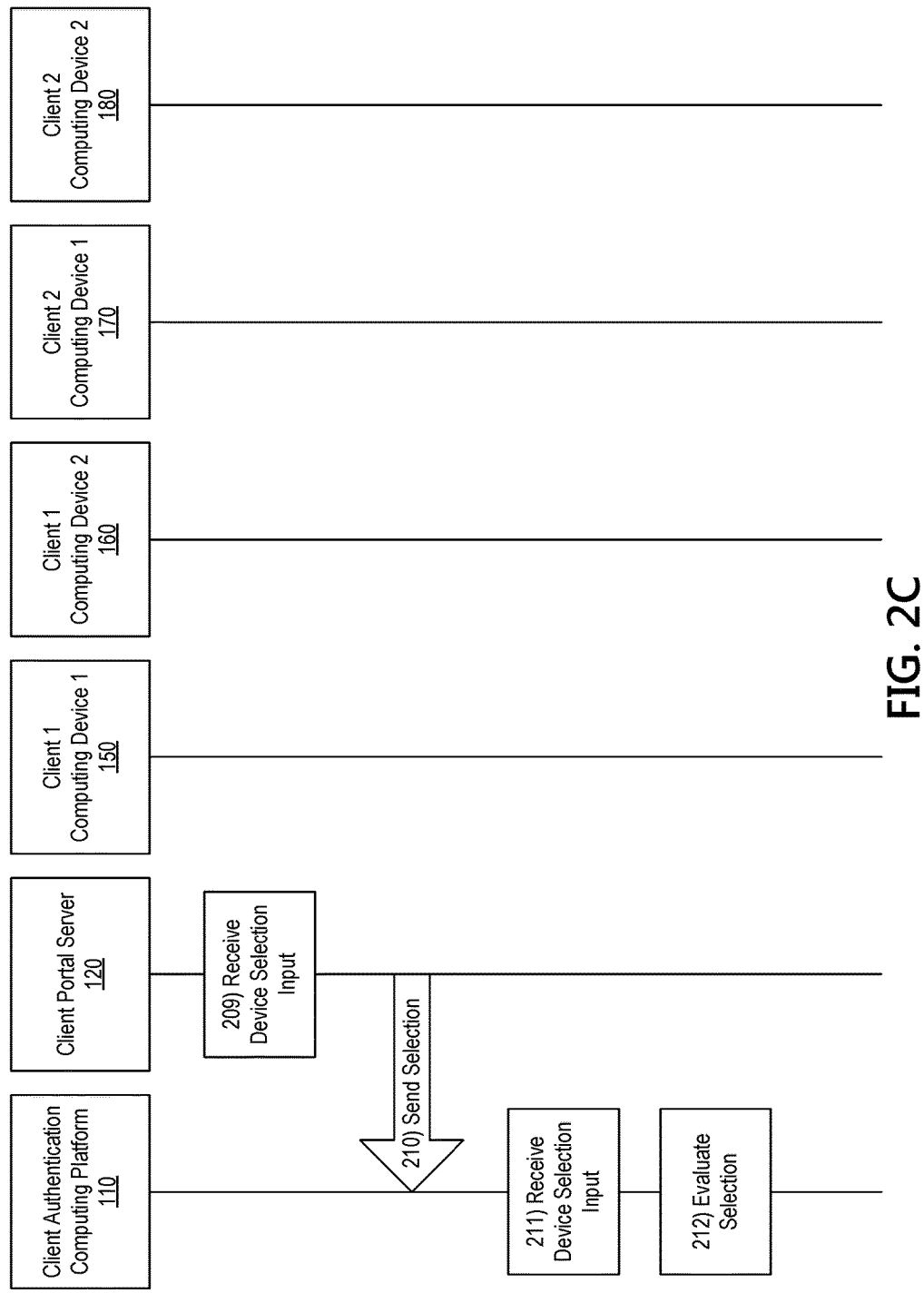

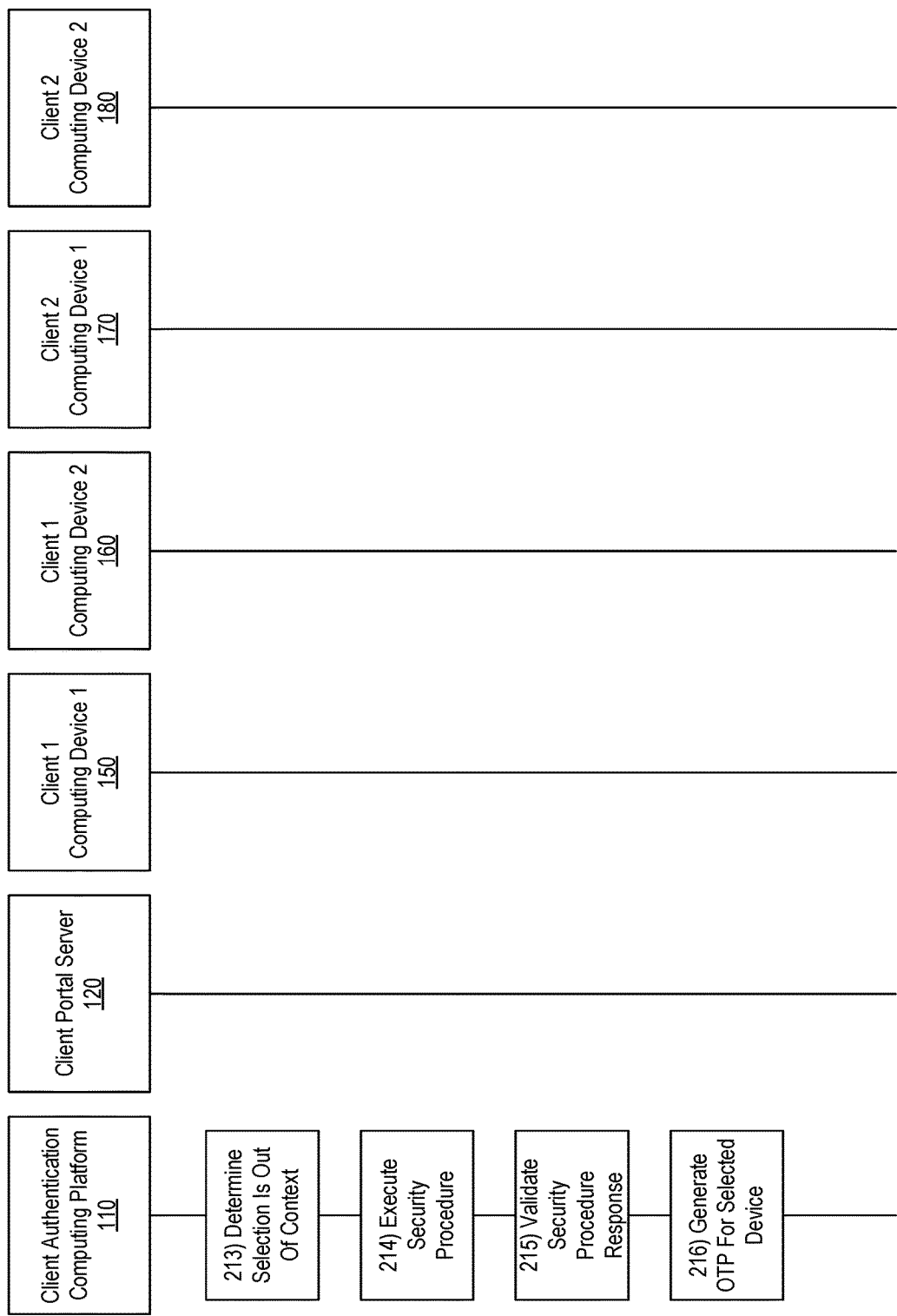

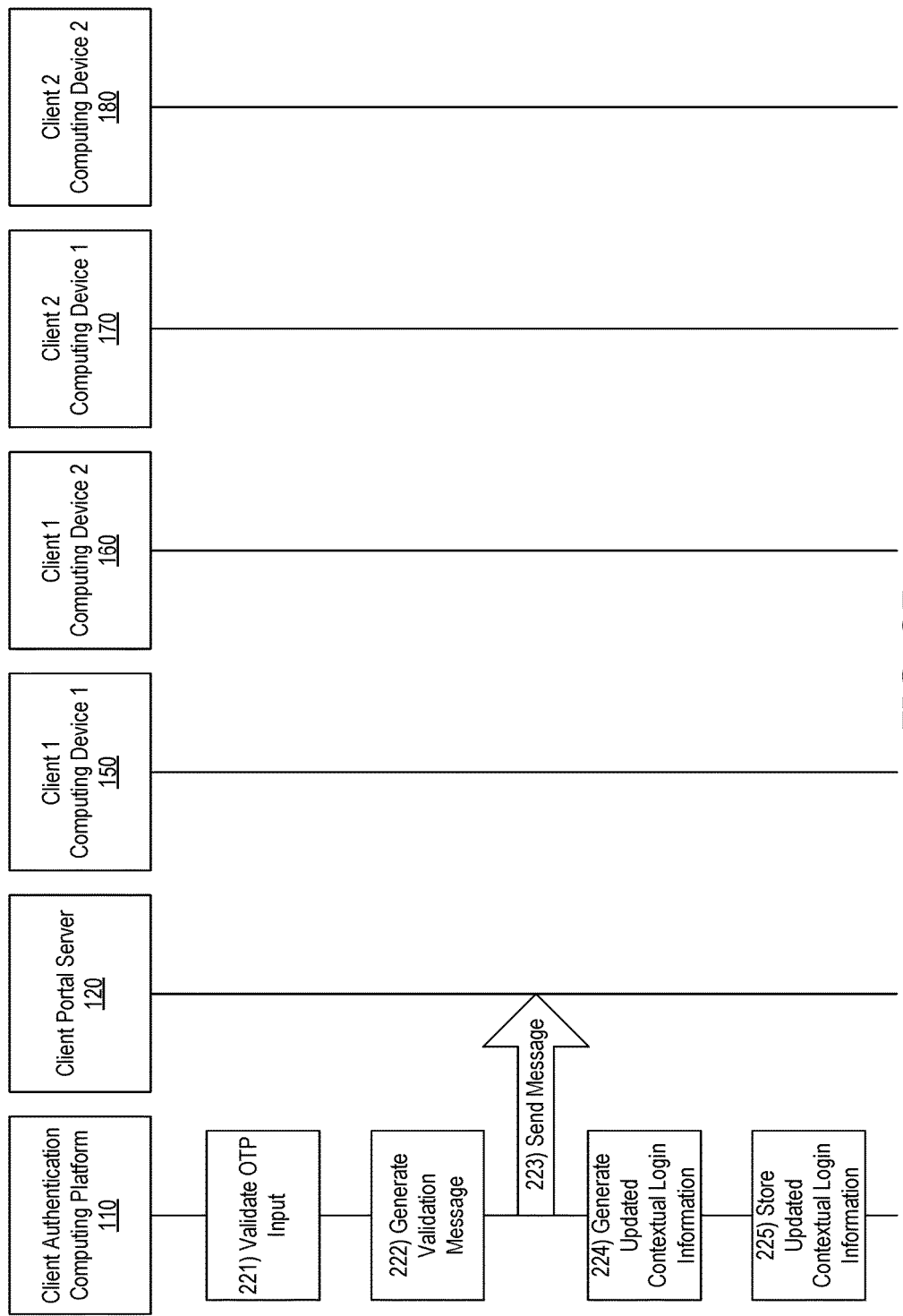

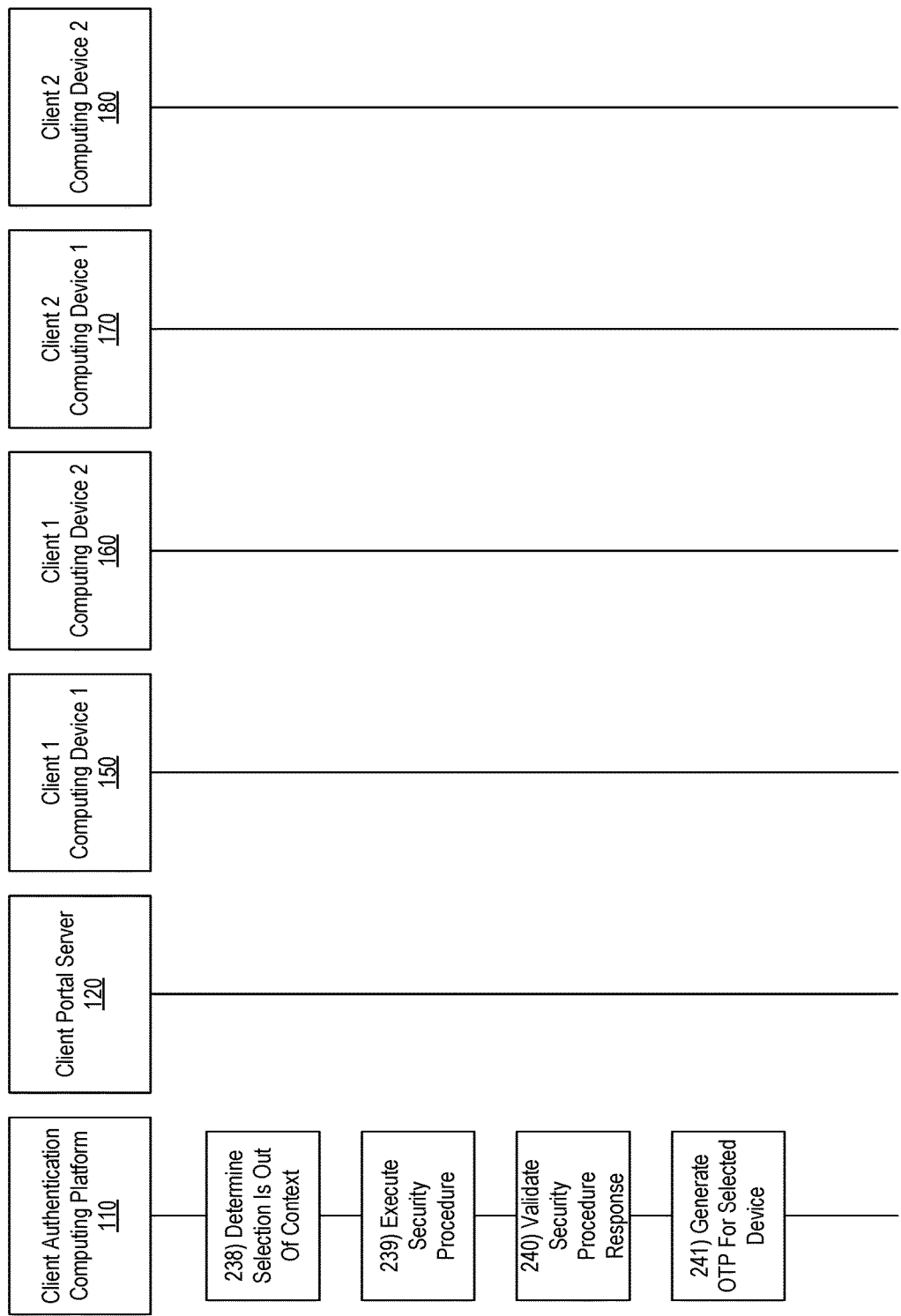

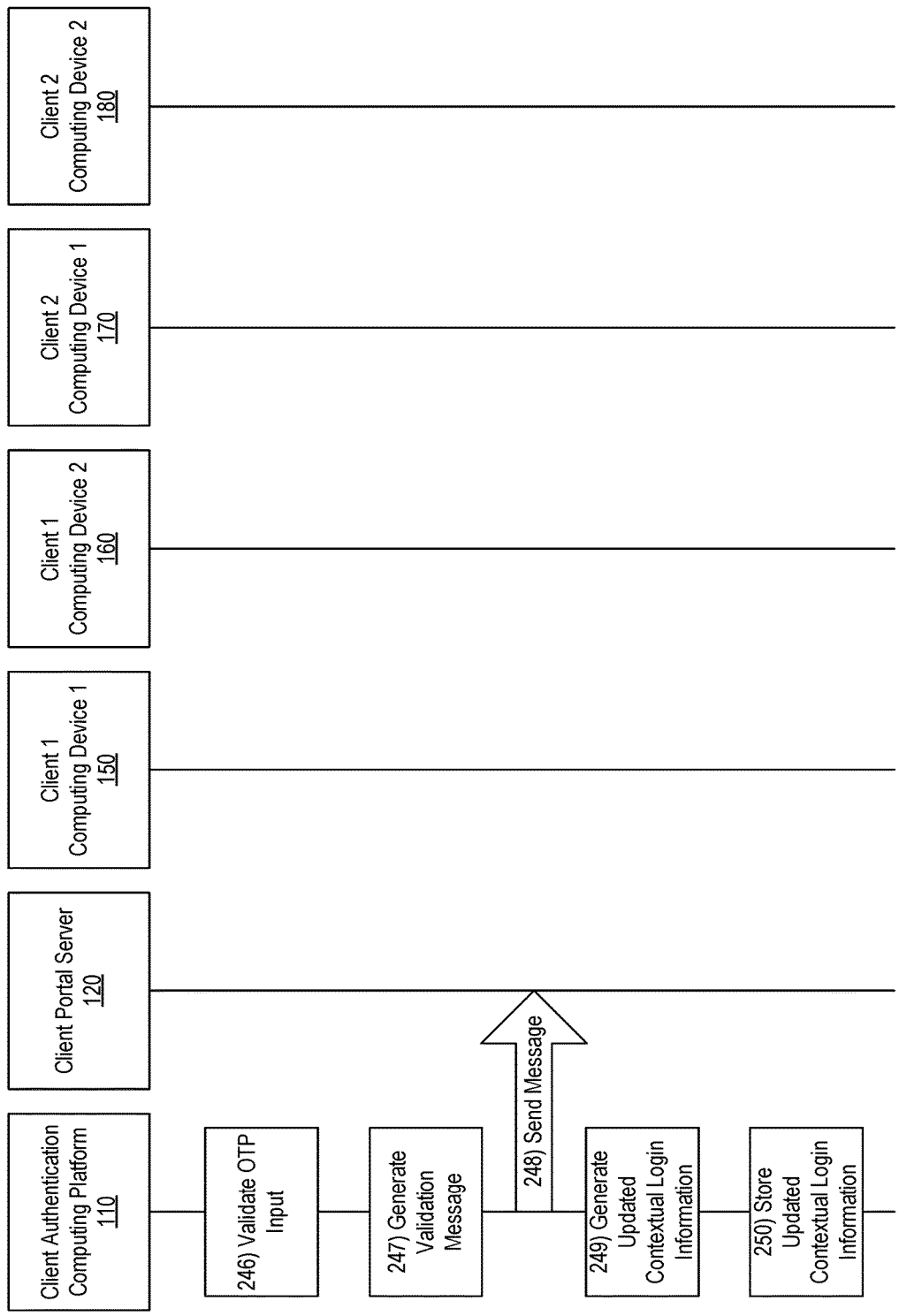

PREVENTING UNAUTHORIZED ACCESS TO SECURED INFORMATION SYSTEMS BASED ON CONTEXTUAL LOGIN INFORMATION

BACKGROUND

Aspects of the disclosure relate to providing information security and preventing unauthorized access to resources of an information system. In particular, one or more aspects of the disclosure relate to preventing unauthorized access to secured information systems based on contextual login information.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by implementing authentication techniques which utilize contextual login information.

In accordance with one or more embodiments, a computing platform having at least one processor, a memory, and a communication interface may receive, via the communication interface, and from a client portal server, a request to authenticate a first user to a first user account associated with a client portal provided by the client portal server. In addition, the computing platform may receive, via the communication interface, and from the client portal server, first device selection input selecting a first registered device to receive at least one one-time passcode. Subsequently, the computing platform may evaluate the first device selection input based on first contextual login information associated with the first user account. Based on evaluating the first device selection input based on the first contextual login information associated with the first user account, the computing platform may determine that the first registered device selected to receive the at least one one-time passcode is out of context. Based on determining that the first registered device selected to receive the at least one one-time passcode is out of context, the computing platform may execute a first security procedure. Subsequently, the computing platform may validate a first response to the first security procedure. Based on validating the first response to the first security procedure, the computing platform may generate a first one-time passcode for the first registered device selected to receive the at least one one-time passcode. Subsequently, the computing platform may send, via the communication interface, and to the first registered device selected to receive the at least one one-time passcode, the first one-time passcode generated for the first registered device selected to receive the at least one one-time passcode. Thereafter, the computing platform may receive, via the communication interface, and from the client portal server, first one-time passcode input. Next, the computing platform may validate the first one-time passcode input received from the client portal server. Based on validating the first one-time passcode input received from the client portal server, the computing platform may generate a first validation message directing the client portal server to provide the first user with access to the first user account. Subsequently, the computing platform may send, via the communication interface, to the client portal server, the first validation message directing the client portal server to provide the first user with access to the first user account.

In some embodiments, prior to receiving the request to authenticate the first user to the first user account associated with the client portal provided by the client portal server, the computing platform may receive first device registration information for the first user account associated with the client portal provided by the client portal server. Subsequently, the computing platform may store the first device registration information for the first user account associated with the client portal provided by the client portal server. In addition, the first device registration information may identify the first registered device and a second registered device as authorized passcode recipients for the first user account associated with the client portal provided by the client portal server.

In some embodiments, in response to receiving the request to authenticate the first user to the first user account associated with the client portal provided by the client portal server, the computing platform may generate a first device selection prompt directing the client portal server to prompt the first user to select a device to receive the at least one one-time passcode. Subsequently, the computing platform may send, via the communication interface, and to the client portal server, the first device selection prompt directing the client portal server to prompt the first user to select the device to receive the at least one one-time passcode.

In some embodiments, evaluating the first device selection input based on the first contextual login information associated with the first user account may include evaluating a current time of day. Additionally or alternatively, evaluating the first device selection input based on the first contextual login information associated with the first user account may include evaluating a current location of the first registered device selected to receive the at least one one-time passcode.

In some embodiments, determining that the first registered device selected to receive the at least one one-time passcode is out of context may include determining that the first registered device selected to receive the at least one one-time passcode is not an expected device to receive the at least one one-time passcode based on a current time of day. Additionally or alternatively, determining that the first registered device selected to receive the at least one one-time passcode is out of context may include determining that the first registered device selected to receive the at least one one-time passcode is not an expected device to receive the at least one one-time passcode based on a current location of the first registered device.

In some embodiments, executing the first security procedure may include generating a challenge question prompt directing the client portal server to prompt the first user to answer at least one challenge question, and sending, to the client portal server, the challenge question prompt directing the client portal server to prompt the first user to answer at least one challenge question. In addition, validating the first response to the first security procedure may include validating a response to the at least one challenge question received from the first user.

In some embodiments, executing the first security procedure may include generating and sending at least one biometric authentication prompt. In addition, validating the first response to the first security procedure may include validating a response to the at least one biometric authentication prompt.

In some embodiments, executing the first security procedure may include generating and sending a one-time passcode prompt. In addition, validating the first response to the first security procedure may include validating a response to the one-time passcode prompt.

In some embodiments, after sending the first validation message directing the client portal server to provide the first user with access to the first user account, the computing platform may generate updated contextual login information for the first user account. Subsequently, the computing platform may store the updated contextual login information for the first user account.

In some embodiments, the computing platform may receive, via the communication interface, and from the client portal server, a request to authenticate a second user to a second user account associated with the client portal provided by the client portal server. In addition, the computing platform may receive, via the communication interface, and from the client portal server, second device selection input selecting a second registered device to receive at least one one-time passcode. Subsequently, the computing platform may evaluate the second device selection input based on second contextual login information associated with the second user account. Based on evaluating the second device selection input based on the second contextual login information associated with the second user account, the computing platform may determine that the second registered device selected to receive the at least one one-time passcode is out of context. Based on determining that the second registered device selected to receive the at least one one-time passcode is out of context, the computing platform may execute a second security procedure. Subsequently, the computing platform may validate a second response to the second security procedure. Based on validating the second response to the second security procedure, the computing platform may generate a second one-time passcode for the second registered device selected to receive the at least one one-time passcode. Subsequently, the computing platform may send, via the communication interface, and to the second registered device selected to receive the at least one one-time passcode, the second one-time passcode generated for the second registered device selected to receive the at least one one-time passcode. Thereafter, the computing platform may receive, via the communication interface, and from the client portal server, second one-time passcode input. Next, the computing platform may validate the second one-time passcode input received from the client portal server. Based on validating the second one-time passcode input received from the client portal server, the computing platform may generate a second validation message directing the client portal server to provide the second user with access to the second user account. Subsequently, the computing platform may send, via the communication interface, to the client portal server, the second validation message directing the client portal server to provide the second user with access to the second user account.

In some embodiments, prior to receiving the request to authenticate the second user to the second user account associated with the client portal provided by the client portal server, the computing platform may receive second device registration information for the second user account associated with the client portal provided by the client portal server. Subsequently, the computing platform may store the second device registration information for the second user account associated with the client portal provided by the client portal server. In addition, the second device registration information may identify the second registered device and a third registered device as authorized passcode recipients for the second user account associated with the client portal provided by the client portal server.

In some embodiments, in response to receiving the request to authenticate the second user to the second user account associated with the client portal provided by the client portal server, the computing platform may generate a second device selection prompt directing the client portal server to prompt the second user to select a device to receive the at least one one-time passcode. Subsequently, the computing platform may send, via the communication interface, and to the client portal server, the second device selection prompt directing the client portal server to prompt the second user to select the device to receive the at least one one-time passcode.

In some embodiments, evaluating the second device selection input based on the second contextual login information associated with the second user account may include evaluating a current time of day. Additionally or alternatively, evaluating the second device selection input based on the second contextual login information associated with the second user account may include evaluating a current location of the second registered device selected to receive the at least one one-time passcode.

In some embodiments, determining that the second registered device selected to receive the at least one one-time passcode is out of context may include determining that the second registered device selected to receive the at least one one-time passcode is not an expected device to receive the at least one one-time passcode based on a current time of day. Additionally or alternatively, determining that the second registered device selected to receive the at least one one-time passcode is out of context may include determining that the second registered device selected to receive the at least one one-time passcode is not an expected device to receive the at least one one-time passcode based on a current location of the second registered device.

In some embodiments, executing the second security procedure may include generating a challenge question prompt directing the client portal server to prompt the second user to answer at least one challenge question, and sending, to the client portal server, the challenge question prompt directing the client portal server to prompt the second user to answer at least one challenge question. In addition, validating the second response to the second security procedure may include validating a response to the at least one challenge question received from the second user.

In some embodiments, executing the second security procedure may include generating and sending at least one biometric authentication prompt. In addition, validating the second response to the second security procedure may include validating a response to the at least one biometric authentication prompt.

In some embodiments, executing the second security procedure may include generating and sending a one-time passcode prompt. In addition, validating the second response to the second security procedure may include validating a response to the one-time passcode prompt.

In some embodiments, after sending the second validation message directing the client portal server to provide the second user with access to the second user account, the computing platform may generate updated contextual login information for the second user account. Subsequently, the computing platform may store the updated contextual login information for the second user account.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2L depict an illustrative event sequence for preventing unauthorized access to secured information systems based on contextual login information in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using multi-device one-time passcode authentication to assess account security risk. For example, an authentication server may adjust a risk score associated with an individual customer based on how the customer attempts to authenticate to online banking or mobile banking. In particular, which registered device(s) the customer requests to receive one-time passcodes (OTPs) at may be used as an input to a risk engine executed on the authentication server.

Figure 1A:
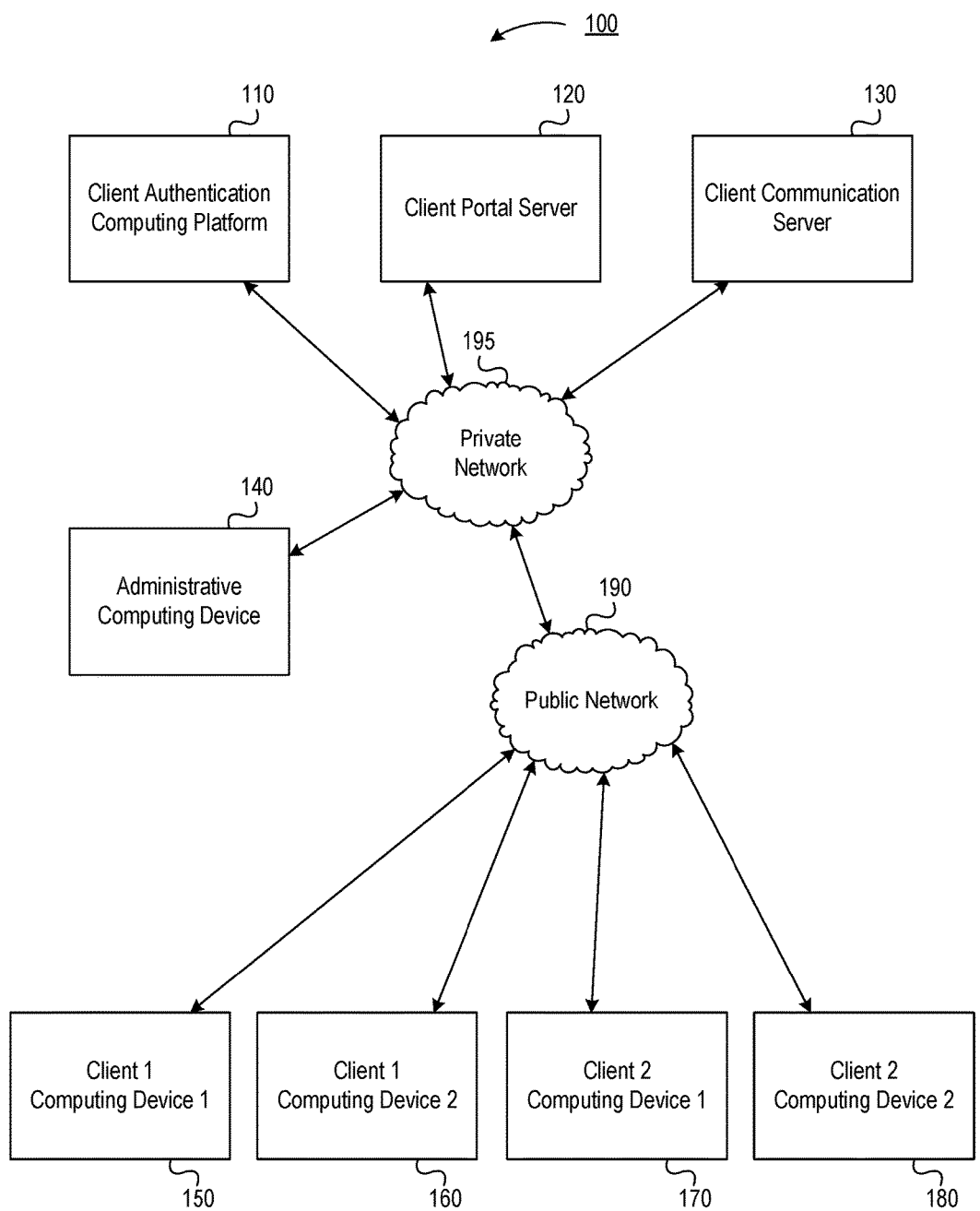
FIGS. 1A and 1B depict an illustrative computing environment for preventing unauthorized access to secured information systems based on contextual login information in accordance with one or more example embodiments.
Figure 1B:
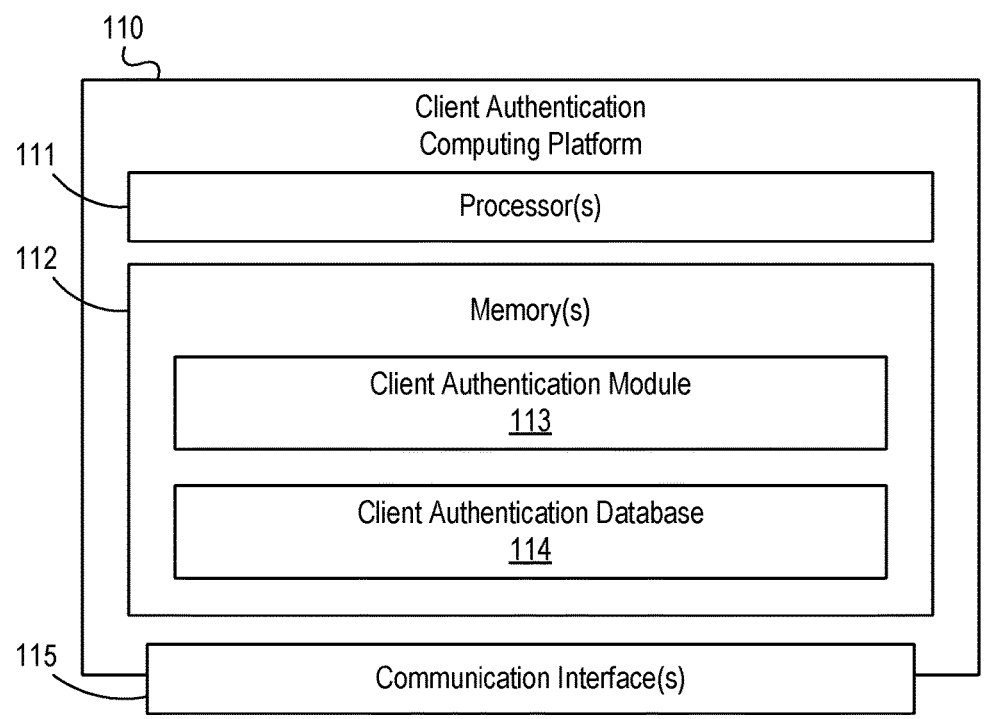

FIGS. 1A and 1B depict an illustrative computing environment for preventing unauthorized access to secured information systems based on contextual login information in accordance with one or more example embodiments. Referring to FIG. 1A, computing environment 100 may include one or more computing devices. For example, computing environment 100 may include a client portal server 120, a client communication server 130, an administrative computing device 140, a first client computing device 150, a second client computing device 160, a third client computing device 170, and a fourth client computing device 180.

Client portal server 120 may be configured to provide one or more portal interfaces to one or more client devices. For example, client portal server 120 may be configured to provide a customer portal, such as an online banking portal, to one or more customers of an organization, such as a financial institution, who may use one or more client computing devices to access the portal, such as client computing device 150, client computing device 160, client computing device 170, and/or client computing device 180, as illustrated in greater detail below. In some instances, in addition to being configured to provide an online banking portal associated with a financial institution to one or more customers of the financial institution and/or their associated computing devices, client portal server 120 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Client communication server 130 may be configured to generate and/or send one or more messages to one or more client devices. For example, client communication server 130 may be configured to generate and/or send one or more account messages, advertising messages, and/or other messages to one or more customers of an organization, such as a financial institution, who may use one or more client computing devices to access the portal, such as client computing device 150, client computing device 160, client computing device 170, and/or client computing device 180. For instance, client communication server 130 may be configured to generate and/or send notifications to client computing device 150, client computing device 160, client computing device 170, and/or client computing device 180, and/or one or more other client computing devices to inform the users of such devices when new account information is available (e.g., when new financial account statements are available, when other new documents are available, or the like), when user-specific deals and/or other offers are available, and/or when other information selected for the users of such devices is available.

Administrative computing device 140 may be configured to provide one or more interfaces that allow for configuration and management of one or more other computing devices and/or computer systems included in computing environment 100. Client computing device 150 may be configured to be used by a first customer of an organization, such as a financial institution. Client computing device 160 also may be configured to be used by the first customer of the organization. In some instances, client computing device 150 and client computing device 160 may, for example, be registered with the organization and/or one or more computer systems in computing environment 100, such that the organization and/or the one or more computer systems maintain one or more records linking client computing device 150 and client computing device 160 to the first customer of the organization, as discussed in greater detail below. Client computing device 170 may be configured to be used by a second customer of the organization (who may, e.g., be different from the first customer of the organization). Client computing device 180 also may be configured to be used by the second customer of the organization. In some instances, client computing device 170 and client computing device 180 may, for example, be registered with the organization and/or one or more computer systems in computing environment 100, such that the organization and/or the one or more computer systems maintain one or more records linking client computing device 170 and client computing device 180 to the second customer of the organization, as discussed in greater detail below.

In one or more arrangements, client portal server 120, client communication server 130, administrative computing device 140, client computing device 150, client computing device 160, client computing device 170, and client computing device 180 may be any type of computing device capable of receiving a user interface, receiving input via the user interface, and communicating the received input to one or more other computing devices. For example, client portal server 120, client communication server 130, administrative computing device 140, client computing device 150, client computing device 160, client computing device 170, and client computing device 180 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client portal server 120, client communication server 130, administrative computing device 140, client computing device 150, client computing device 160, client computing device 170, and client computing device 180 may, in some instances, be special-purpose computing devices configured to perform specific functions.

Computing environment 100 also may include one or more computing platforms. For example, computing environment 100 may include client authentication computing platform 110. As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Computing environment 100 also may include one or more networks, which may interconnect one or more of client authentication computing platform 110, client portal server 120, client communication server 130, administrative computing device 140, client computing device 150, client computing device 160, client computing device 170, and client computing device 180. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, client authentication computing platform 110, client portal server 120, client communication server 130, and administrative computing device 140 may be associated with an organization (e.g., a financial institution), and private network 195 may be associated with and/or operated by the organization, and may include one or more networks (e.g., LANs, WANs, virtual private networks (VPNs), or the like) that interconnect client authentication computing platform 110, client portal server 120, client communication server 130, and administrative computing device 140 and one or more other computing devices and/or computer systems that are used by, operated by, and/or otherwise associated with the organization. Public network 190 may connect private network 195 and/or one or more computing devices connected thereto (e.g., client authentication computing platform 110, client portal server 120, client communication server 130, and administrative computing device 140) with one or more networks and/or computing devices that are not associated with the organization. For example, client computing device 150, client computing device 160, client computing device 170, and client computing device 180 might not be associated with an organization that operates private network 195 (e.g., because client computing device 150, client computing device 160, client computing device 170, and client computing device 180 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect client computing device 150, client computing device 160, client computing device 170, and client computing device 180 to private network 195 and/or one or more computing devices connected thereto (e.g., client authentication computing platform 110, client portal server 120, client communication server 130, and administrative computing device 140).

Referring to FIG. 1B, client authentication computing platform 110 may include one or more processors 111, memory 112, and communication interface 115. A data bus may interconnect processor(s) 111, memory 112, and communication interface 115. Communication interface 115 may be a network interface configured to support communication between client authentication computing platform 110 and one or more networks (e.g., private network 195, public network 190, or the like). Memory 112 may include one or more program modules having instructions that when executed by processor(s) 111 cause client authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 113 and a client authentication database 114. Client authentication module 113 may have instructions that direct and/or cause client authentication computing platform 110 to authenticate one or more users and/or devices using authentication techniques which utilize contextual login information and/or to perform other functions, as discussed in greater detail below. Client authentication database 114 may store information used by client authentication module 113 and/or client authentication computing platform 110 in authenticating one or more users and/or devices using authentication techniques which utilize contextual login information and/or in performing other functions.

Figure 2A:
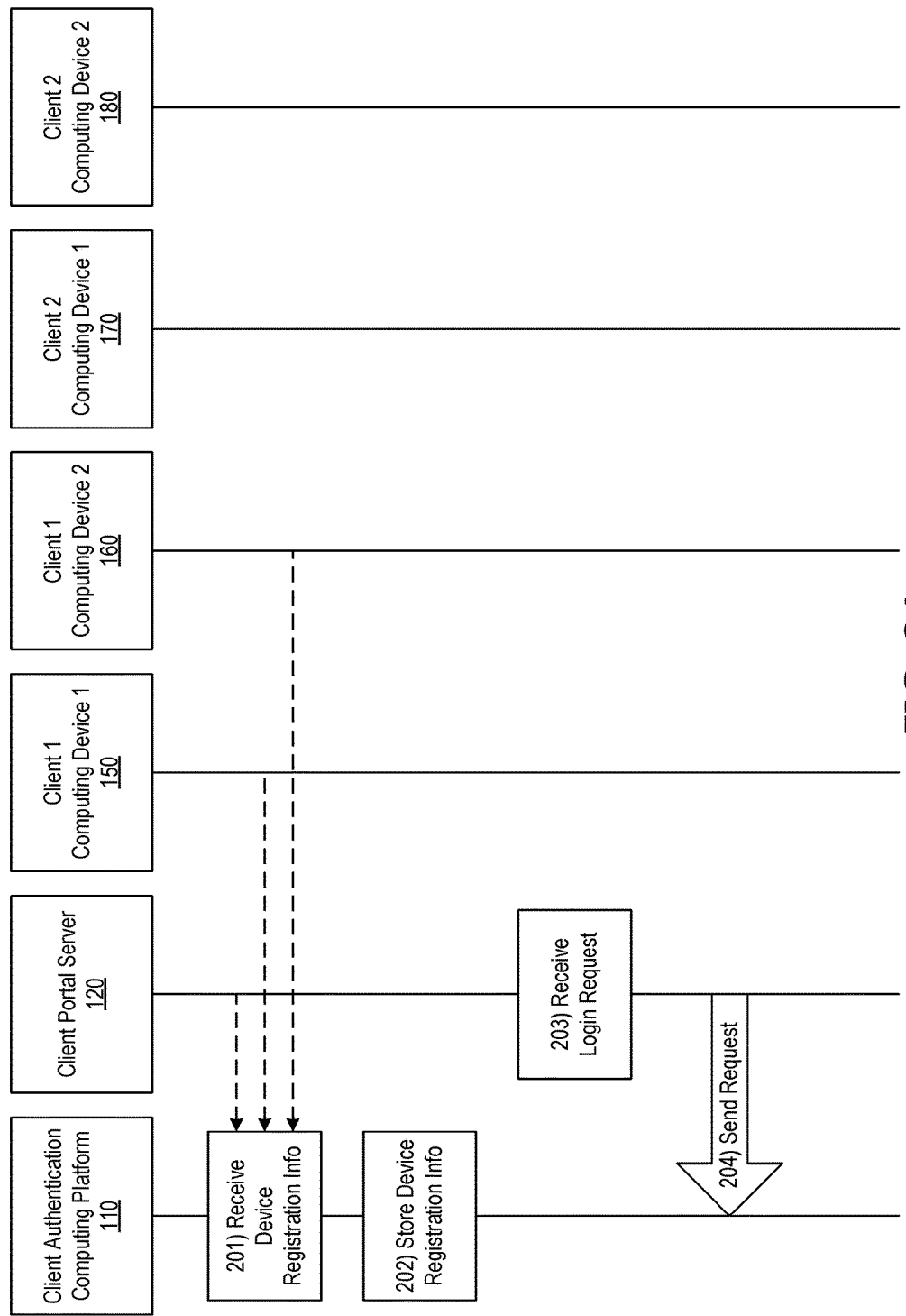

FIGS. 2A-2L depict an illustrative event sequence for preventing unauthorized access to secured information systems based on contextual login information in accordance with one or more example embodiments. Referring to FIG. 2A, at step 201, client authentication computing platform 110 may receive device registration information for a first user account (e.g., from client portal server 120, client computing device 150, client computing device 160, and/or one or more other devices). For example, at step 201, client authentication computing platform 110 may receive first device registration information for a first user account associated with a client portal provided by a client portal server (e.g., client portal server 120). Such device registration information may, for example, register and/or otherwise link client computing device 150, client computing device 160, and/or one or more other devices to the first user account (e.g., as authorized one-time passcode recipient devices for the first user account). For example, the first device registration information may identify a first registered device (e.g., client computing device 150) and a second registered device (e.g., client computing device 160) as authorized passcode recipients for the first user account associated with the client portal provided by the client portal server (e.g., client portal server 120). In some instances, such device registration information may, for example, include a unique identifier associated with a particular client device being registered (such as client computing device 150 or client computing device 160, for instance), a name and/or label associated with the particular client device being registered, one or more client portal usernames associated with the particular client device being registered, one or more account numbers and/or other account identifiers associated with the particular client device being registered, one or more authorized regions and/or countries associated with the particular client device being registered, and/or other information.

At step 202, client authentication computing platform 110 may store the device registration information for the first user account. For example, at step 202, client authentication computing platform 110 may store the first device registration information for the first user account associated with the client portal provided by the client portal server (e.g., client portal server 120).

At step 203, client portal server 120 may receive a login request. For example, at step 203, client portal server 120 may receive a login request from client computing device 150, client computing device 160, and/or another computing device requesting access to the client portal provided by the client portal server (e.g., client portal server 120) and/or to the first user account associated with the client portal provided by the client portal server (e.g., client portal server 120). At step 204, client portal server 120 may send an authentication request to client authentication computing platform 110. For example, at step 204, client portal server 120 may send an authentication request to client authentication computing platform 110 requesting client authentication computing platform 110 to authenticate a user of the client portal associated with the login request to a particular user account to which the user of the client portal has requested access (which may, e.g., be the first user account associated with the client portal provided by client portal server 120).

Figure 2B:
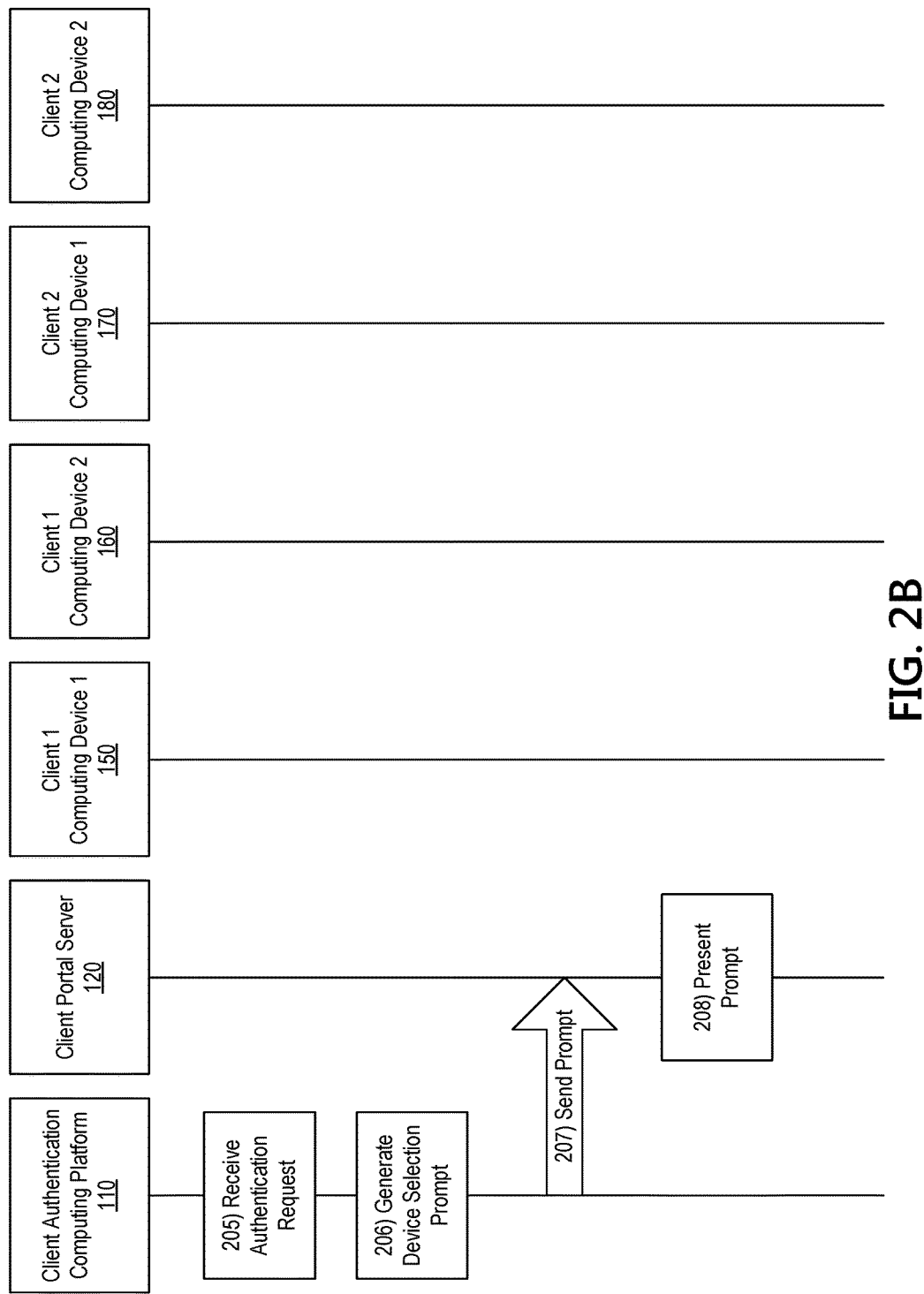

Referring to FIG. 2B, at step 205, client authentication computing platform 110 may receive the authentication request from client portal server 120. For example, at step 205, client authentication computing platform 110 may receive, via the communication interface (e.g., communication interface 115), and from the client portal server (e.g., client portal server 120), a request to authenticate a first user to the first user account associated with the client portal provided by the client portal server (e.g., client portal server 120).

At step 206, client authentication computing platform 110 may generate a device selection prompt. For example, at step 206, in response to receiving the request to authenticate the first user to the first user account associated with the client portal provided by the client portal server (e.g., client portal server 120), client authentication computing platform 110 may generate a first device selection prompt directing the client portal server (e.g., client portal server 120) to prompt the first user to select a device to receive the at least one one-time passcode. At step 207, client authentication computing platform 110 may send the device selection prompt to client portal server 120. For example, at step 207, client authentication computing platform 110 may send, via the communication interface (e.g., communication interface 115), and to the client portal server (e.g., client portal server 120), the first device selection prompt directing the client portal server (e.g., client portal server 120) to prompt the first user to select the device to receive the at least one one-time passcode. For instance, the first device selection prompt may be configured to cause client portal server 120 to prompt a user of the client portal to select one or more registered devices that are linked to the first user account to receive a one-time passcode, such as client computing device 150, client computing device 160, and/or one or more other devices.

Figure 3:
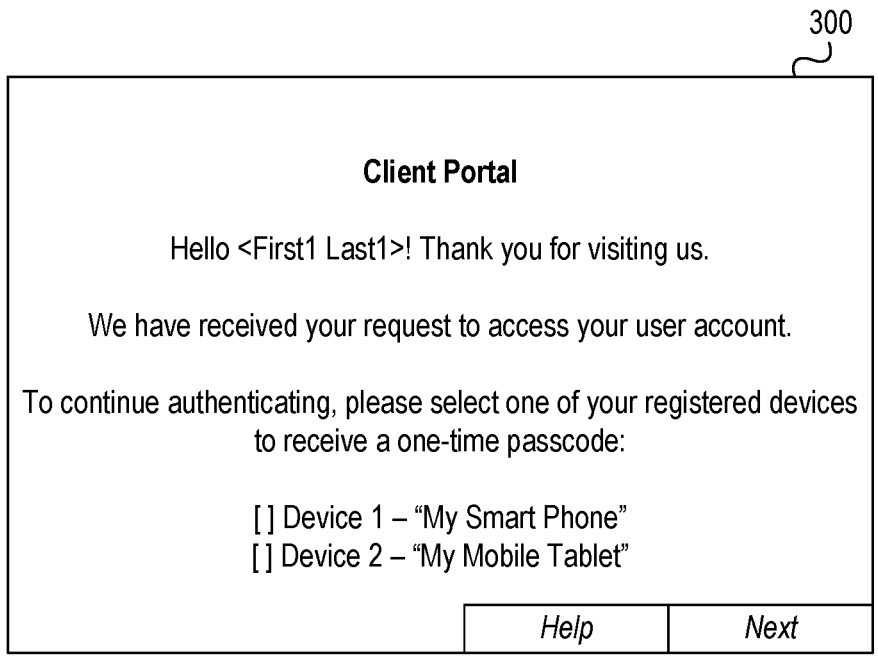
FIGS. 3-6 depict example graphical user interfaces for preventing unauthorized access to secured information systems based on contextual login information in accordance with one or more example embodiments.

At step 208, client portal server 120 may present the device selection prompt received from client authentication computing platform 110. For example, in presenting the device selection prompt at step 208, client portal server 120 may present and/or cause one or more computing devices (e.g., the device being used by the user of the client portal provided by client portal server 120 to request access to the first user account) to display a graphical user interface similar to graphical user interface 300, which is illustrated in FIG. 3. As seen in FIG. 3, graphical user interface 300 may include information prompting a user to select a registered device to receive a one-time passcode to continue with the authentication process (e.g., "To continue authenticating, please select one of your registered devices to receive a one-time passcode"), as well as one or more controls configured to allow the user to make a selection (e.g., "[ ] Device 1—'My Smart Phone'; [ ] Device 2—'My Mobile Tablet'").

Referring to FIG. 2C, at step 209, client portal server 120 may receive device selection input. Such device selection input may be received by client portal server 120 via the user interface presented at step 208, for example, and may correspond to and/or include a selection of a particular device to receive one or more one-time passcodes as part of the authentication process being performed. At step 210, client portal server 120 may send the device selection input to client authentication computing platform 110.

At step 211, client authentication computing platform 110 may receive the device selection input from client portal server 120. For example, at step 211, client authentication computing platform 110 may receive, via the communication interface (e.g., communication interface 115), and from the client portal server (e.g., client portal server 120), first device selection input selecting a first registered device to receive at least one one-time passcode.

At step 212, client authentication computing platform 110 may evaluate the device selection input received from client portal server 120. For example, at step 212, client authentication computing platform 110 may evaluate the first device selection input based on first contextual login information associated with the first user account. The contextual login information may, for example, include historical records identifying individual attempted login events and/or completed login events associated with the particular user account, including device information specifying which device(s) were used in connection with each event, location information specifying where such device(s) were located, timing information specifying what time and/or day each event occurred, and/or other information. Additionally or alternatively, the contextual login information may, for example, include predictive information and/or trend information (which may, e.g., be generated by client authentication computing platform 110 based on the attempted login events and/or completed login events) associated with the particular user account. In addition, and as illustrated below, client authentication computing platform 110 may evaluate the device selection input to determine if the device selected to receive a one-time passcode matches a usual device and/or expected device as indicated in the contextual login information given the current time of day, current device location information, and/or other contextual factors.

In some embodiments, evaluating the first device selection input based on the first contextual login information associated with the first user account comprises evaluating a current time of day. For example, in evaluating the first device selection input based on the first contextual login information associated with the first user account (e.g., at step 212), client authentication computing platform 110 may evaluate a current time of day.

In some embodiments, evaluating the first device selection input based on the first contextual login information associated with the first user account comprises evaluating a current location of the first registered device selected to receive the at least one one-time passcode. For example, in evaluating the first device selection input based on the first contextual login information associated with the first user account (e.g., at step 212), client authentication computing platform 110 may evaluate a current location of the first registered device selected to receive the at least one one-time passcode (e.g., client computing device 150). In some instances, client authentication computing platform 110 also may analyze the location of other registered devices associated with the user account (e.g., client computing device 160) and/or the location of the device being used by the first user of the client portal to request access to the first user account. In some instances, in evaluating and/or otherwise analyzing such location information, client authentication computing platform 110 may locate one or more devices and/or otherwise obtain device location information by generating and/or sending one or more location polling messages to the one or more devices, which may be received and/or responded to by the operating systems executing on the one or more devices and/or by a mobile banking application or other application executing on the one or more devices.

Referring to FIG. 2D, at step 213, client authentication computing platform 110 may determine that the selected device is out of context. For example, at step 213, based on evaluating the first device selection input based on the first contextual login information associated with the first user account, client authentication computing platform 110 may determine that the first registered device selected to receive the at least one one-time passcode (e.g., client computing device 150) is out of context. Client authentication computing platform 110 may, for instance, determine that the first registered device selected to receive the at least one one-time passcode (e.g., client computing device 150) is out of context where the device selected to receive the one-time passcode does not match the usual device and/or expected device (e.g., as indicated in the contextual login information) given the current time of day, current device location information, and/or other contextual factors.

In some embodiments, determining that the first registered device selected to receive the at least one one-time passcode is out of context comprises determining that the first registered device selected to receive the at least one one-time passcode is not an expected device to receive the at least one one-time passcode based on a current time of day. For example, in determining that the first registered device selected to receive the at least one one-time passcode is out of context (e.g., at step 213), client authentication computing platform 110 may determine that the first registered device selected to receive the at least one one-time passcode is not an expected device to receive the at least one one-time passcode based on a current time of day. For instance, if the contextual login information indicates that the device selected to receive the one-time passcode has never been used to receive a one-time passcode (or, e.g., not been used within a predefined time period, such as within the last ninety days) at the current time and/or within a current time window (e.g., within plus or minus one hour of the current time), client authentication computing platform 110 may determine that the device selected to receive the one-time passcode is not an expected device to receive the one-time passcode based on the current time of day.

In some embodiments, determining that the first registered device selected to receive the at least one one-time passcode is out of context comprises determining that the first registered device selected to receive the at least one one-time passcode is not an expected device to receive the at least one one-time passcode based on a current location of the first registered device. For example, in determining that the first registered device selected to receive the at least one one-time passcode is out of context (e.g., at step 213), client authentication computing platform 110 may determine that the first registered device selected to receive the at least one one-time passcode is not an expected device to receive the at least one one-time passcode based on a current location of the first registered device. For instance, if the contextual login information indicates that the device selected to receive the one-time passcode has never been used to receive a one-time passcode (or, e.g., not been used within a predefined time period, such as within the last ninety days) at the current location and/or within a predetermined range of the current location (e.g., within a one-mile radius of the current location), client authentication computing platform 110 may determine that the device selected to receive the one-time passcode is not an expected device to receive the one-time passcode based on the current location of the first registered device. Additionally or alternatively, in determining that the first registered device selected to receive the at least one one-time passcode is out of context (e.g., at step 213), client authentication computing platform 110 may analyze the location of one or more other devices, such as one or more other registered devices associated with the user account and/or the device being used by the first user to request access to the first user account from client portal server 120.

Figure 4:
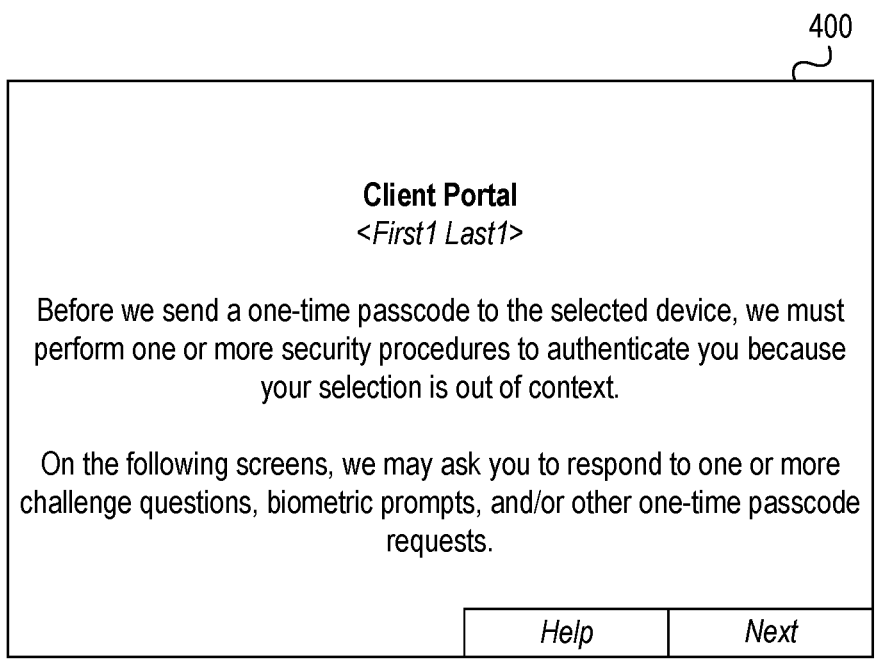

At step 214, client authentication computing platform 110 may execute a security procedure. For example, at step 214, based on determining that the first registered device selected to receive the at least one one-time passcode is out of context, client authentication computing platform 110 may execute a first security procedure. In performing such a security procedure, client authentication computing platform 110 may, for instance, generate and/or send one or more prompts, such as one or more challenge question prompts, one or more biometric authentication prompts, and/or one or more one-time passcode prompts, and may validate one or more responses to the one or more prompts, as discussed in greater detail below. Additionally or alternatively, in performing such a security procedure, client authentication computing platform 110 may generate and/or send one or more messages to client portal server 120 directing client portal server 120 to present and/or cause one or more computing devices to display a graphical user interface similar to graphical user interface 400, which is illustrated in FIG. 4. As seen in FIG. 4, graphical user interface 400 may include information indicating that the selected device is out of context (e.g., "Before we send a one-time passcode to the selected device, we must perform one or more security procedures to authenticate you because your selection is out of context.") as well as information indicating that a security procedure is being and/or will be executed (e.g., "On the following screens, we may ask you to respond to one or more challenge questions, biometric prompts, and/or other one-time passcode requests.").

At step 215, client authentication computing platform 110 may validate a security procedure response. For example, at step 215, client authentication computing platform 110 may validate a first response to the first security procedure (e.g., by determining whether a response to the security procedure executed at step 214 and/or received by client authentication computing platform 110 is valid). If client authentication computing platform 110 determines that the security procedure response is valid at step 215, then the event sequence may continue as illustrated. Alternatively, if client authentication computing platform 110 determines that the security procedure response is not valid at step 215, client authentication computing platform 110 may generate and/or send one or more error messages, the security procedure may be repeated and/or re-attempted, and/or the event sequence may end.

In some embodiments, executing the first security procedure may include: generating a challenge question prompt directing the client portal server to prompt the first user to answer at least one challenge question; and sending, to the client portal server, the challenge question prompt directing the client portal server to prompt the first user to answer at least one challenge question. In addition, validating the first response to the first security procedure may include validating a response to the at least one challenge question received from the first user. For example, in executing the first security procedure (e.g., at step 214), client authentication computing platform 110 may generate a challenge question prompt directing the client portal server (e.g., client portal server 120) to prompt the first user to answer at least one challenge question. Subsequently, client authentication computing platform 110 may send, to the client portal server (e.g., client portal server 120), the challenge question prompt directing the client portal server (e.g., client portal server 120) to prompt the first user to answer at least one challenge question. In addition, in validating the first response to the first security procedure (e.g., at step 215), client authentication computing platform 110 may validate a response to the at least one challenge question received from the first user.

In some embodiments, executing the first security procedure may include generating and sending at least one biometric authentication prompt, and validating the first response to the first security procedure may include validating a response to the at least one biometric authentication prompt. For example, in executing the first security procedure (e.g., at step 214), client authentication computing platform 110 may generate and send at least one biometric authentication prompt. Such a biometric authentication prompt may be sent to one or more registered devices linked to the first user account (e.g., client computing device 150, client computing device 160) and/or to the client portal server (e.g., client portal server 120) to prompt the user requesting access to the first user account to provide biometric input on the device being used to request access. In addition, in validating the first response to the first security procedure (e.g., at step 215), client authentication computing platform 110 may validate a response to the at least one biometric authentication prompt.

In some embodiments, executing the first security procedure may include generating and sending a one-time passcode prompt, and validating the first response to the first security procedure may include validating a response to the one-time passcode prompt. For example, in executing the first security procedure (e.g., at step 214), client authentication computing platform 110 may generate and send a one-time passcode prompt. Such a one-time passcode prompt may, for instance, be generated for and/or sent to a registered device (e.g., client computing device 150, client computing device 160) different from the device selected by the user to receive the at least one one-time passcode (e.g., at step 209). In addition, in validating the first response to the first security procedure (e.g., at step 215), client authentication computing platform 110 may validate a response to the at least one one-time passcode.

At step 216, client authentication computing platform 110 may generate a one-time passcode for the selected device (e.g., based on and/or in response to validating a security procedure response at step 215). For example, at step 216, based on validating the first response to the first security procedure, client authentication computing platform 110 may generate a first one-time passcode for the first registered device selected to receive the at least one one-time passcode.

Figure 2E:
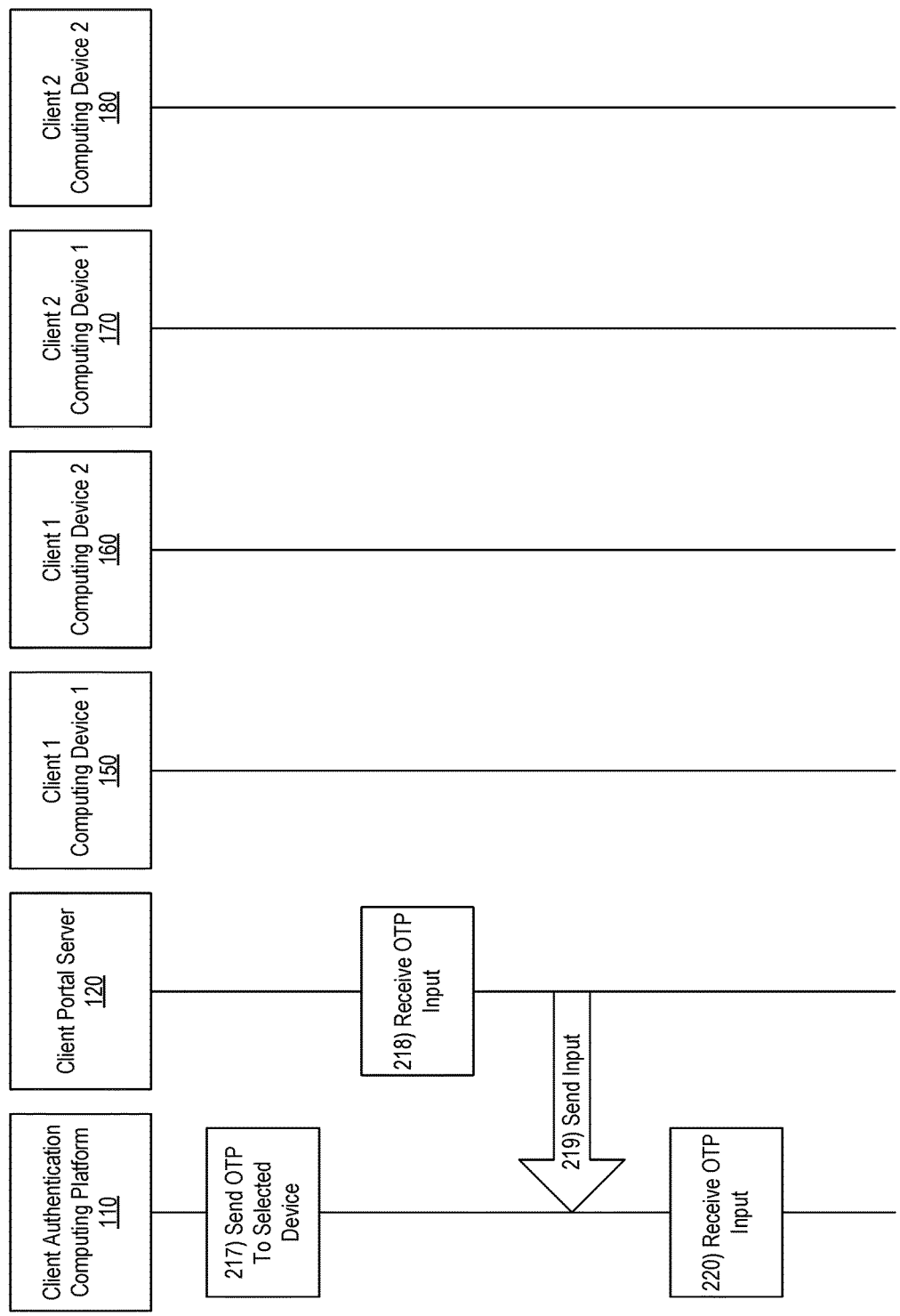

Referring to FIG. 2E, at step 217, client authentication computing platform 110 may send the one-time passcode to the selected device. For example, at step 217, client authentication computing platform 110 may send, via the communication interface (e.g., communication interface 115), and to the first registered device selected to receive the at least one one-time passcode, the first one-time passcode generated for the first registered device selected to receive the at least one one-time passcode.

At step 218, client portal server 120 may receive one-time passcode input. For example, at step 218, client portal server 120 may receive one-time passcode input via one or more user interfaces presented by client portal server 120, and such one-time passcode input may include the first one-time passcode generated by client authentication computing platform 110 for the first registered device selected to receive the at least one one-time passcode. At step 219, client portal server 120 may send the one-time passcode input to client authentication computing platform 110. At step 220, client authentication computing platform 110 may receive the one-time passcode input from client portal server 120. For example, at step 220, client authentication computing platform 110 may receive, via the communication interface (e.g., communication interface 115), and from the client portal server (e.g., client portal server 120), first one-time passcode input.

Referring to FIG. 2F, at step 221, client authentication computing platform 110 may validate the one-time passcode input received from client portal server 120. For example, at step 221, client authentication computing platform 110 may validate the first one-time passcode input received from the client portal server (e.g., client portal server 120). In validating the first one-time passcode input, client authentication computing platform 110 may, for example, compare the first one-time passcode input to the first one-time passcode generated by client authentication computing platform 110 for the first registered device selected to receive the at least one one-time passcode to confirm that the first one-time passcode input matches the first one-time passcode generated by client authentication computing platform 110 for the first registered device selected to receive the at least one one-time passcode and is therefore valid. If client authentication computing platform 110 determines that the first one-time passcode input does not match the first one-time passcode generated by client authentication computing platform 110 for the first registered device selected to receive the at least one one-time passcode and is therefore not valid, client authentication computing platform 110 may generate and/or send one or more error messages to client portal server 120 and/or one or more other devices. Such error messages may, for instance, prompt the user of client portal server 120 requesting access to the first user account to try entering the one-time passcode again, and if the user again provides invalid one-time passcode input, client authentication computing platform 110 may deny access to the first user account and/or the event sequence may end. If the first one-time passcode input is valid, the event sequence may continue as illustrated.

At step 222, client authentication computing platform 110 may generate a validation message. For example, at step 222, based on validating the first one-time passcode input received from the client portal server (e.g., client portal server 120), client authentication computing platform 110 may generate a first validation message directing the client portal server (e.g., client portal server 120) to provide the first user with access to the first user account. In some instances, in generating the first validation message directing the client portal server (e.g., client portal server 120) to provide the first user with access to the first user account, client authentication computing platform 110 may embed and/or otherwise include one or more tokens, certificates, and/or keys in the first validation message, and such tokens, certificates, and/or keys may be configured to enable and/or cause client portal server 120 to load and/or obtain user account information associated with the first user account from one or more other servers (which may, e.g., be associated with an organization, such as a financial institution, operating client authentication computing platform 110 and/or client portal server 120). For example, client authentication computing platform 110 may embed and/or otherwise include one or more tokens, certificates, and/or keys in the first validation message that enable and/or cause client portal server 120 to request, obtain, receive, and/or load financial account information associated with the first user account from one or more financial account management servers, so that client portal server 120 may subsequently present such financial account information via the client portal.

At step 223, client authentication computing platform 110 may send the validation message to client portal server 120. For example, at step 223, client authentication computing platform 110 may send, via the communication interface (e.g., communication interface 115), to the client portal server (e.g., client portal server 120), the first validation message directing the client portal server (e.g., client portal server 120) to provide the first user with access to the first user account.

At step 224, client authentication computing platform 110 may generate updated contextual login information. For example, at step 224, after sending the first validation message directing the client portal server (e.g., client portal server 120) to provide the first user with access to the first user account, client authentication computing platform 110 may generate updated contextual login information for the first user account. The updated contextual login information for the first user account generated by client authentication computing platform 110 may, for example, be indicative of and/or generated based on the selected device being used to receive a one-time passcode when authenticating and/or providing access to the first user account. Client authentication computing platform 110 may, for example, use such updated contextual login information when processing a future login request for the first user account (e.g., to "remember" that the selected device was previously used to receive a one-time passcode for the user account while at a particular time and/or at a particular location).

At step 225, client authentication computing platform 110 may store the updated contextual login information. For example, at step 225, client authentication computing platform 110 may store the updated contextual login information for the first user account (e.g., in client authentication database 114).

Subsequently, one or more steps of the event sequence discussed above may be repeated by client authentication computing platform 110 and/or the other systems discussed above in authenticating another user to the client portal provided by client portal server 120. Although such steps are illustrated separately and following the steps performed with respect to authenticating the first user, various steps may be performed in a different order, such that client authentication computing platform 110 may, for instance, authenticate multiple users simultaneously as client portal server 120 receives requests to access different user accounts from different users.

Figure 2G:
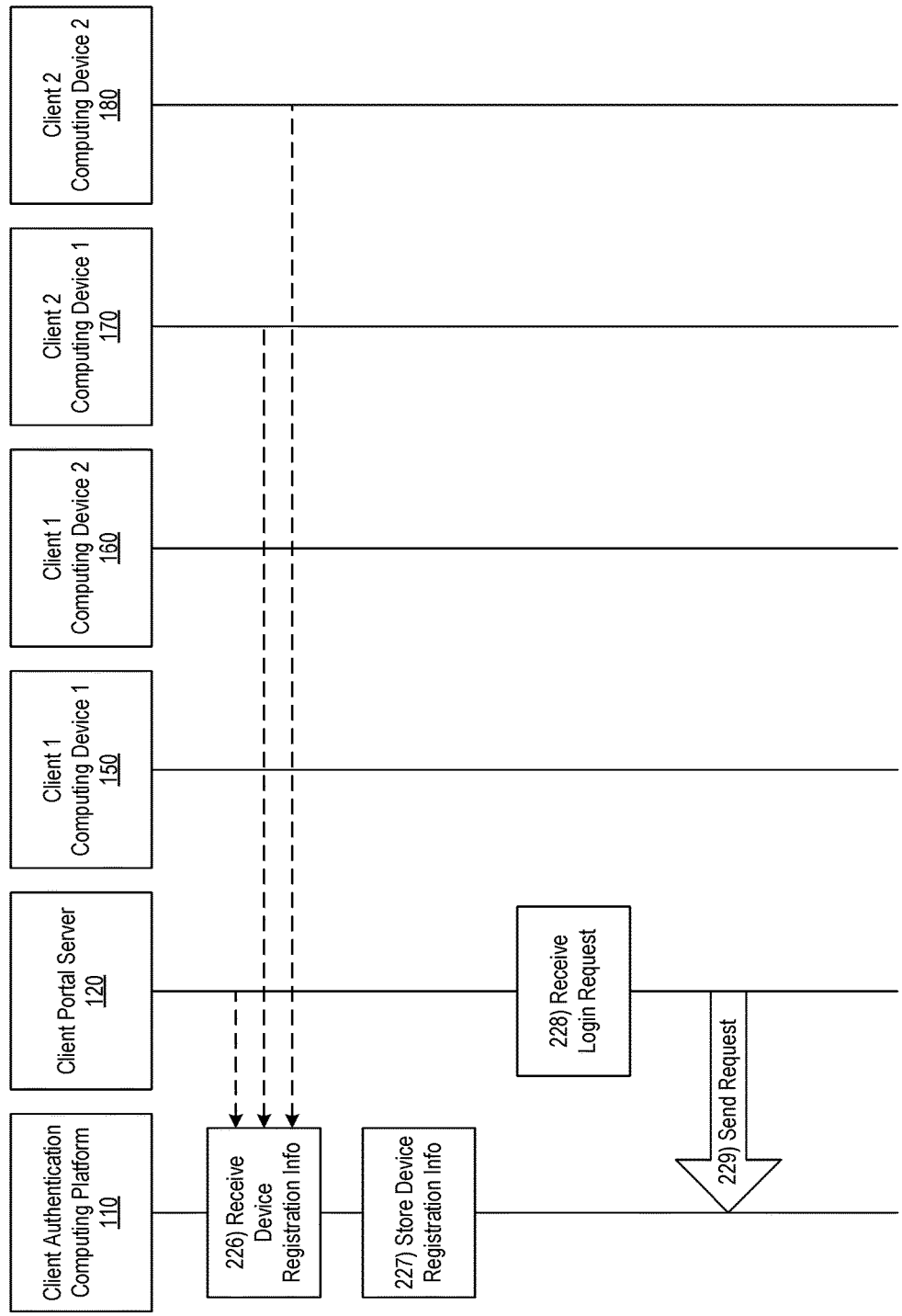

Referring to FIG. 2G, at step 226, client authentication computing platform 110 may receive device registration information for a second user account (e.g., from client portal server 120, client computing device 170, client computing device 180, and/or one or more other devices). For example, at step 226, client authentication computing platform 110 may receive second device registration information for the second user account associated with the client portal provided by the client portal server (e.g., client portal server 120). Such device registration information may, for example, register and/or otherwise link client computing device 170, client computing device 180, and/or one or more other devices to the second user account (e.g., as authorized one-time passcode recipient devices for the second user account). For example, the second device registration information may identify a first registered device (e.g., client computing device 170) and a second registered device (e.g., client computing device 180) as authorized passcode recipients for the second user account associated with the client portal provided by the client portal server (e.g., client portal server 120). In some instances, such device registration information may, for example, include a unique identifier associated with a particular client device being registered (such as client computing device 170 or client computing device 180, for instance), a name and/or label associated with the particular client device being registered, one or more client portal usernames associated with the particular client device being registered, one or more account numbers and/or other account identifiers associated with the particular client device being registered, one or more authorized regions and/or countries associated with the particular client device being registered, and/or other information.

At step 227, client authentication computing platform 110 may store the device registration information for the second user account. For example, at step 227, client authentication computing platform 110 may store the second device registration information for the second user account associated with the client portal provided by the client portal server (e.g., client portal server 120).

At step 228, client portal server 120 may receive a login request. For example, at step 228, client portal server 120 may receive a login request from client computing device 170, client computing device 180, and/or another computing device requesting access to the client portal provided by the client portal server (e.g., client portal server 120) and/or to the second user account associated with the client portal provided by the client portal server (e.g., client portal server 120). At step 229, client portal server 120 may send an authentication request to client authentication computing platform 110. For example, at step 229, client portal server 120 may send an authentication request to client authentication computing platform 110 requesting client authentication computing platform 110 to authenticate a user of the client portal associated with the login request to a particular user account to which the user of the client portal has requested access (which may, e.g., be the second user account associated with the client portal provided by client portal server 120).

Figure 2H:
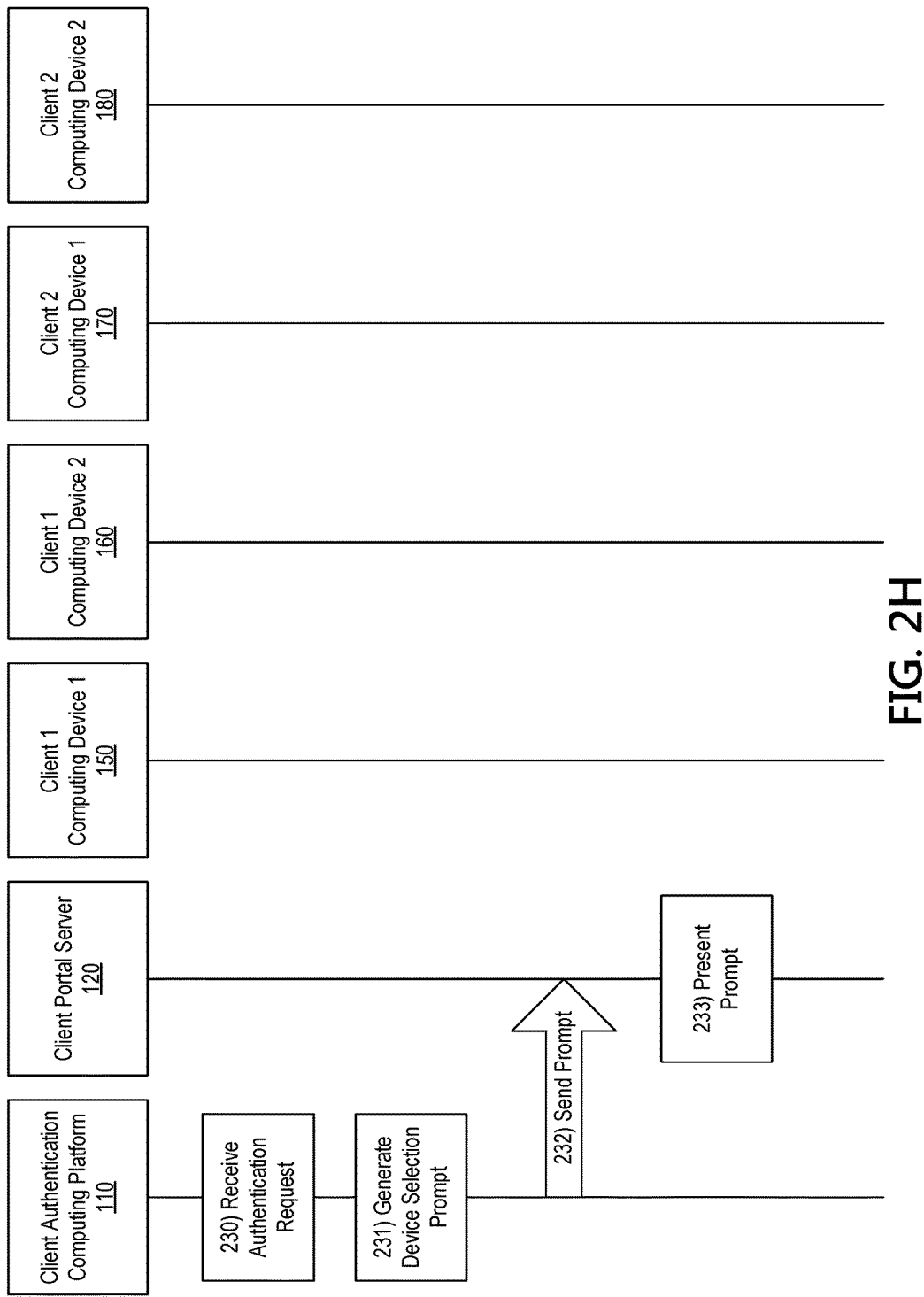

Referring to FIG. 2H, at step 230, client authentication computing platform 110 may receive the authentication request from client portal server 120. For example, at step 230, client authentication computing platform 110 may receive, via the communication interface (e.g., communication interface), and from the client portal server (e.g., client portal server 120), a request to authenticate a second user to a second user account associated with the client portal provided by the client portal server (e.g., client portal server 120).

At step 231, client authentication computing platform 110 may generate a device selection prompt. For example, at step 231, in response to receiving the request to authenticate the second user to the second user account associated with the client portal provided by the client portal server (e.g., client portal server 120), client authentication computing platform 110 may generate a second device selection prompt directing the client portal server (e.g., client portal server 120) to prompt the second user to select a device to receive the at least one one-time passcode. At step 232, client authentication computing platform 110 may send the device selection prompt to client portal server 120. For example, at step 232, client authentication computing platform 110 may send, via the communication interface (e.g., communication interface 115), and to the client portal server (e.g., client portal server 120), the second device selection prompt directing the client portal server (e.g., client portal server 120) to prompt the second user to select the device to receive the at least one one-time passcode. For instance, the second device selection prompt may be configured to cause client portal server 120 to prompt a user of the client portal to select one or more registered devices that are linked to the second user account to receive a one-time passcode, such as client computing device 170, client computing device 180, and/or one or more other devices.

Figure 5:
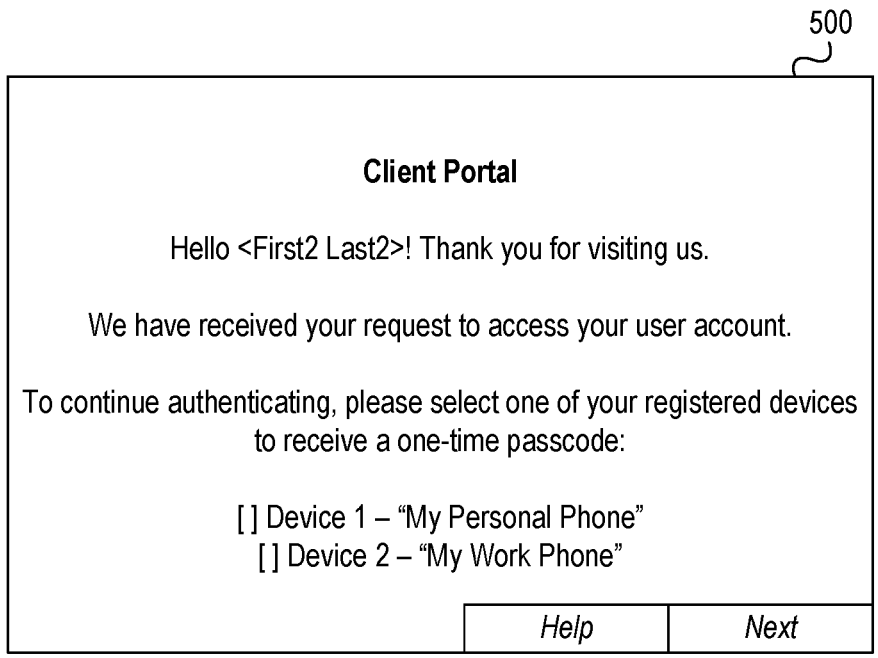

At step 233, client portal server 120 may present the device selection prompt. For example, in presenting the device selection prompt at step 233, client portal server 120 may present and/or cause one or more computing devices (e.g., the device being used by the user of the client portal provided by client portal server 120 to request access to the second user account) to display a graphical user interface similar to graphical user interface 500, which is illustrated in FIG. 5. As seen in FIG. 5, graphical user interface 500 may include information prompting a user to select a registered device to receive a one-time passcode to continue with the authentication process (e.g., "To continue authenticating, please select one of your registered devices to receive a one-time passcode"), as well as one or more controls configured to allow the user to make a selection (e.g., "[ ] Device 1—'My Personal Phone'; [ ] Device 2—'My Work Phone'").

Figure 2I:
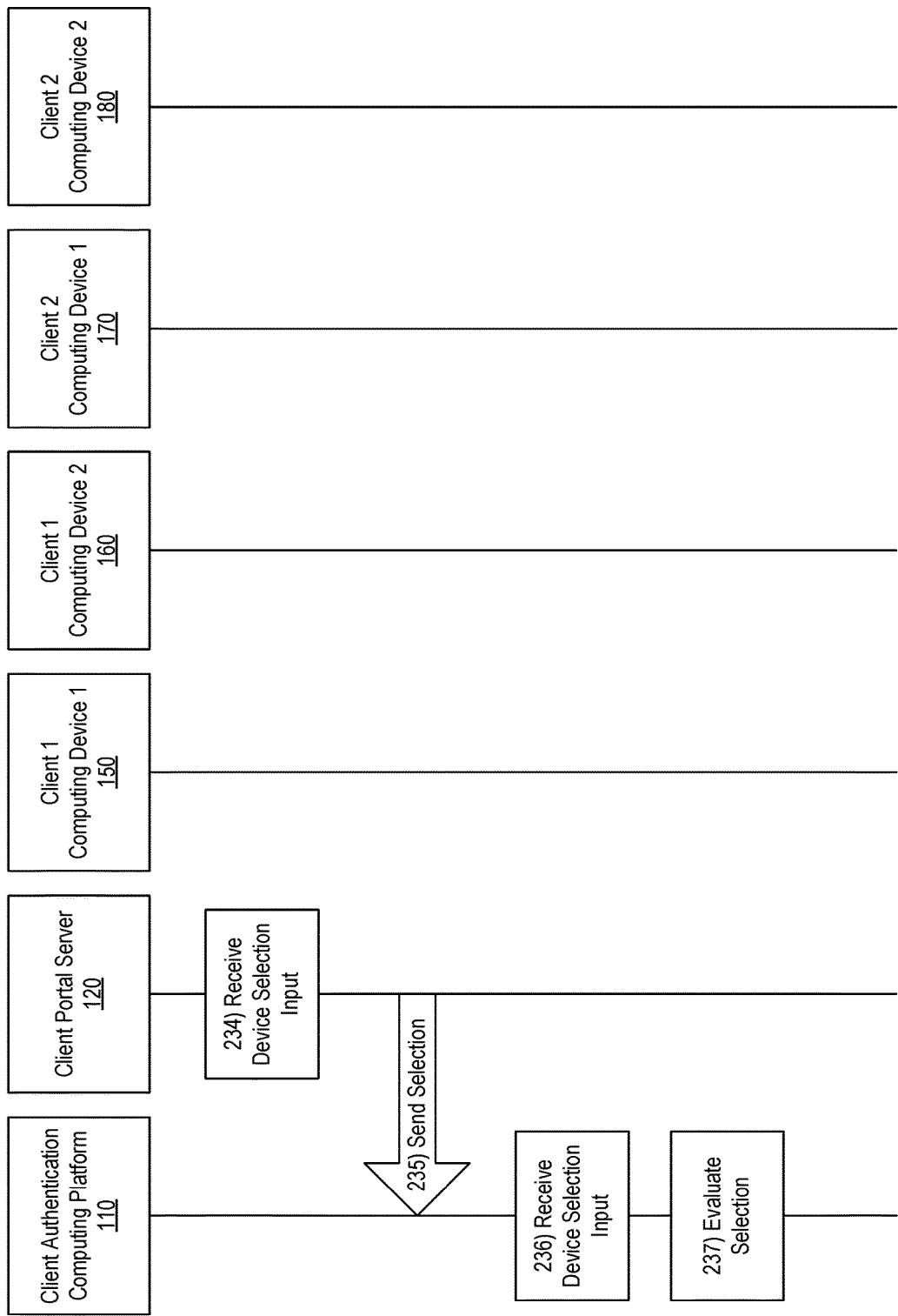

Referring to FIG. 2I, at step 234, client portal server 120 may receive device selection input. Such device selection input may be received by client portal server 120 via the user interface presented at step 233, for example, and may correspond to and/or include a selection of a particular device to receive one or more one-time passcodes as part of the authentication process being performed. At step 235, client portal server 120 may send the device selection input to client authentication computing platform 110.

At step 236, client authentication computing platform 110 may receive the device selection input from client portal server 120. For example, at step 236, client authentication computing platform 110 may receive, via the communication interface (e.g., communication interface 115), and from the client portal server (e.g., client portal server 120), second device selection input selecting a second registered device to receive at least one one-time passcode.

At step 237, client authentication computing platform 110 may evaluate the device selection input received from client portal server 120. For example, at step 237, client authentication computing platform 110 may evaluate the second device selection input based on second contextual login information associated with the second user account. The contextual login information may, for example, include historical records identifying individual attempted login events and/or completed login events associated with the particular user account, including device information specifying which device(s) were used in connection with each event, location information specifying where such device(s) were located, timing information specifying what time and/or day each event occurred, and/or other information. Additionally or alternatively, the contextual login information may, for example, include predictive information and/or trend information (which may, e.g., be generated by client authentication computing platform 110 based on the attempted login events and/or completed login events) associated with the particular user account. In addition, and as illustrated below, client authentication computing platform 110 may evaluate the device selection input to determine if the device selected to receive a one-time passcode matches a usual device and/or expected device as indicated in the contextual login information given the current time of day, current device location information, and/or other contextual factors.

In some embodiments, evaluating the second device selection input based on the second contextual login information associated with the second user account comprises evaluating a current time of day. For example, in evaluating the second device selection input based on the second contextual login information associated with the second user account (e.g., at step 237), client authentication computing platform 110 may evaluate a current time of day.

In some embodiments, evaluating the second device selection input based on the second contextual login information associated with the second user account comprises evaluating a current location of the second registered device selected to receive the at least one one-time passcode. For example, in evaluating the second device selection input based on the second contextual login information associated with the second user account (e.g., at step 237), client authentication computing platform 110 may a current location of the second registered device selected to receive the at least one one-time passcode (e.g., client computing device 170). In some instances, client authentication computing platform 110 also may analyze the location of other registered devices associated with the user account (e.g., client computing device 180) and/or the location of the device being used by the second user of the client portal to request access to the second user account. In some instances, in evaluating and/or otherwise analyzing such location information, client authentication computing platform 110 may locate one or more devices and/or otherwise obtain device location information by generating and/or sending one or more location polling messages to the one or more devices, which may be received and/or responded to by the operating systems executing on the one or more devices and/or by a mobile banking application or other application executing on the one or more devices.

Referring to FIG. 2J, at step 238, client authentication computing platform 110 may determine that the selected device is out of context. For example, at step 238, based on evaluating the second device selection input based on the second contextual login information associated with the second user account, client authentication computing platform 110 may determine that the second registered device selected to receive the at least one one-time passcode (e.g., client computing device 170) is out of context. Client authentication computing platform 110 may, for instance, determine that the second registered device selected to receive the at least one one-time passcode (e.g., client computing device 170) is out of context where the device selected to receive the one-time passcode does not match the usual device and/or expected device (e.g., as indicated in the contextual login information) given the current time of day, current device location information, and/or other contextual factors.

In some embodiments, determining that the second registered device selected to receive the at least one one-time passcode is out of context comprises determining that the second registered device selected to receive the at least one one-time passcode is not an expected device to receive the at least one one-time passcode based on a current time of day. For example, in determining that the second registered device selected to receive the at least one one-time passcode is out of context (e.g., at step 238), client authentication computing platform 110 may determine that the second registered device selected to receive the at least one one-time passcode is not an expected device to receive the at least one one-time passcode based on a current time of day. For instance, if the contextual login information indicates that the device selected to receive the one-time passcode has never been used to receive a one-time passcode (or, e.g., not been used within a predefined time period, such as within the last ninety days) at the current time and/or within a current time window (e.g., within plus or minus one hour of the current time), client authentication computing platform 110 may determine that the device selected to receive the one-time passcode is not an expected device to receive the one-time passcode based on the current time of day.

In some embodiments, determining that the second registered device selected to receive the at least one one-time passcode is out of context comprises determining that the second registered device selected to receive the at least one one-time passcode is not an expected device to receive the at least one one-time passcode based on a current location of the second registered device. For example, in determining that the second registered device selected to receive the at least one one-time passcode is out of context (e.g., at step 238), client authentication computing platform 110 may determine that the second registered device selected to receive the at least one one-time passcode is not an expected device to receive the at least one one-time passcode based on a current location of the second registered device. For instance, if the contextual login information indicates that the device selected to receive the one-time passcode has never been used to receive a one-time passcode (or, e.g., not been used within a predefined time period, such as within the last ninety days) at the current location and/or within a predetermined range of the current location (e.g., within a one-mile radius of the current location), client authentication computing platform 110 may determine that the device selected to receive the one-time passcode is not an expected device to receive the one-time passcode based on the current location of the second registered device. Additionally or alternatively, in determining that the second registered device selected to receive the at least one one-time passcode is out of context (e.g., at step 238), client authentication computing platform 110 may analyze the location of one or more other devices, such as one or more other registered devices associated with the user account and/or the device being used by the second user to request access to the second user account from client portal server 120.

Figure 6:
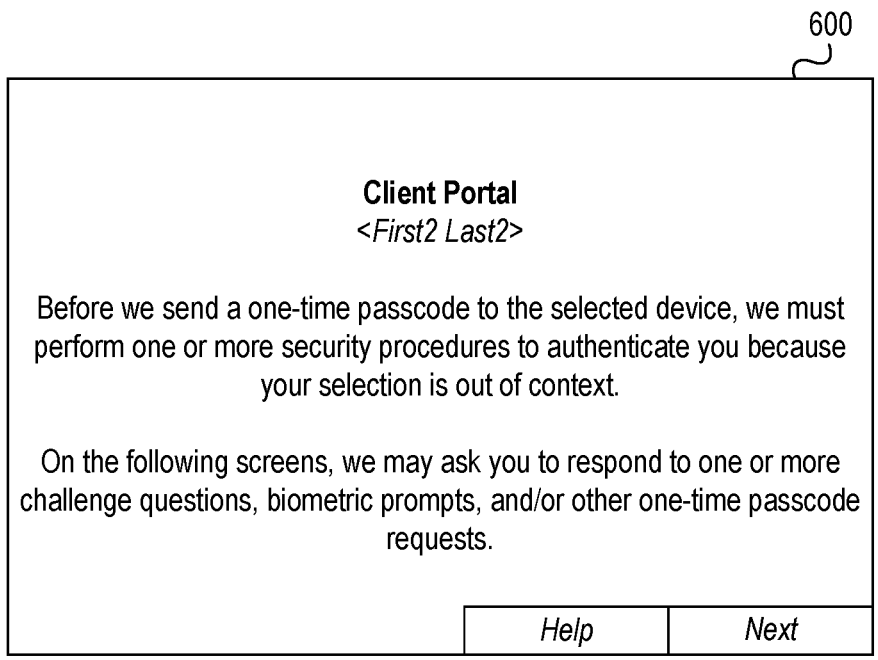

At step 239, client authentication computing platform 110 may execute a security procedure. For example, at step 239, based on determining that the second registered device selected to receive the at least one one-time passcode is out of context, client authentication computing platform 110 may execute a second security procedure. In performing such a security procedure, client authentication computing platform 110 may, for instance, generate and/or send one or more prompts, such as one or more challenge question prompts, one or more biometric authentication prompts, and/or one or more one-time passcode prompts, and may validate one or more responses to the one or more prompts, as discussed in greater detail below. Additionally or alternatively, in performing such a security procedure, client authentication computing platform 110 may generate and/or send one or more messages to client portal server 120 directing client portal server 120 to present and/or cause one or more computing devices to display a graphical user interface similar to graphical user interface 600, which is illustrated in FIG. 6. As seen in FIG. 6, graphical user interface 600 may include information indicating that the selected device is out of context (e.g., "Before we send a one-time passcode to the selected device, we must perform one or more security procedures to authenticate you because your selection is out of context.") as well as information indicating that a security procedure is being and/or will be executed (e.g., "On the following screens, we may ask you to respond to one or more challenge questions, biometric prompts, and/or other one-time passcode requests.").

At step 240, client authentication computing platform 110 may validate a security procedure response. For example, at step 240, client authentication computing platform 110 may validate a second response to the second security procedure (e.g., by determining whether a response to the security procedure executed at step 239 and/or received by client authentication computing platform 110 is valid). If client authentication computing platform 110 determines that the security procedure response is valid at step 240, then the event sequence may continue as illustrated. Alternatively, if client authentication computing platform 110 determines that the security procedure response is not valid at step 240, client authentication computing platform 110 may generate and/or send one or more error messages, the security procedure may be repeated and/or re-attempted, and/or the event sequence may end.

In some embodiments, executing the second security procedure may include: generating a challenge question prompt directing the client portal server to prompt the second user to answer at least one challenge question; and sending, to the client portal server, the challenge question prompt directing the client portal server to prompt the second user to answer at least one challenge question. In addition, validating the second response to the second security procedure may include validating a response to the at least one challenge question received from the second user. For example, in executing the second security procedure (e.g., at step 239), client authentication computing platform 110 may generate a challenge question prompt directing the client portal server (e.g., client portal server 120) to prompt the second user to answer at least one challenge question. Subsequently, client authentication computing platform 110 may send, to the client portal server (e.g., client portal server 120), the challenge question prompt directing the client portal server (e.g., client portal server 120) to prompt the second user to answer at least one challenge question. In addition, in validating the second response to the second security procedure (e.g., at step 240), client authentication computing platform 110 may validate a response to the at least one challenge question received from the second user.

In some embodiments, executing the second security procedure may include generating and sending at least one biometric authentication prompt, and validating the second response to the second security procedure may include validating a response to the at least one biometric authentication prompt. For example, in executing the second security procedure (e.g., at step 239), client authentication computing platform 110 may generate and send at least one biometric authentication prompt. Such a biometric authentication prompt may be sent to one or more registered devices linked to the second user account (e.g., client computing device 170, client computing device 180) and/or to the client portal server (e.g., client portal server 120) to prompt the user requesting access to the second user account to provide biometric input on the device being used to request access. In addition, in validating the second response to the second security procedure (e.g., at step 240), client authentication computing platform 110 may validate a response to the at least one biometric authentication prompt.

In some embodiments, executing the second security procedure may include generating and sending a one-time passcode prompt, and validating the second response to the second security procedure may include validating a response to the one-time passcode prompt. For example, in executing the second security procedure (e.g., at step 239), client authentication computing platform 110 may generate and send a one-time passcode prompt. Such a one-time passcode prompt may, for instance, be generated for and/or sent to a registered device (e.g., client computing device 170, client computing device 180) different from the device selected by the user to receive the at least one one-time passcode (e.g., at step 234). In addition, in validating the second response to the second security procedure (e.g., at step 240), client authentication computing platform 110 may validate a response to the at least one one-time passcode.

At step 241, client authentication computing platform 110 may generate a one-time passcode for the selected device. For example, at step 241, based on validating the second response to the second security procedure, client authentication computing platform 110 may generate a second one-time passcode for the second registered device selected to receive the at least one one-time passcode.

Figure 2K:
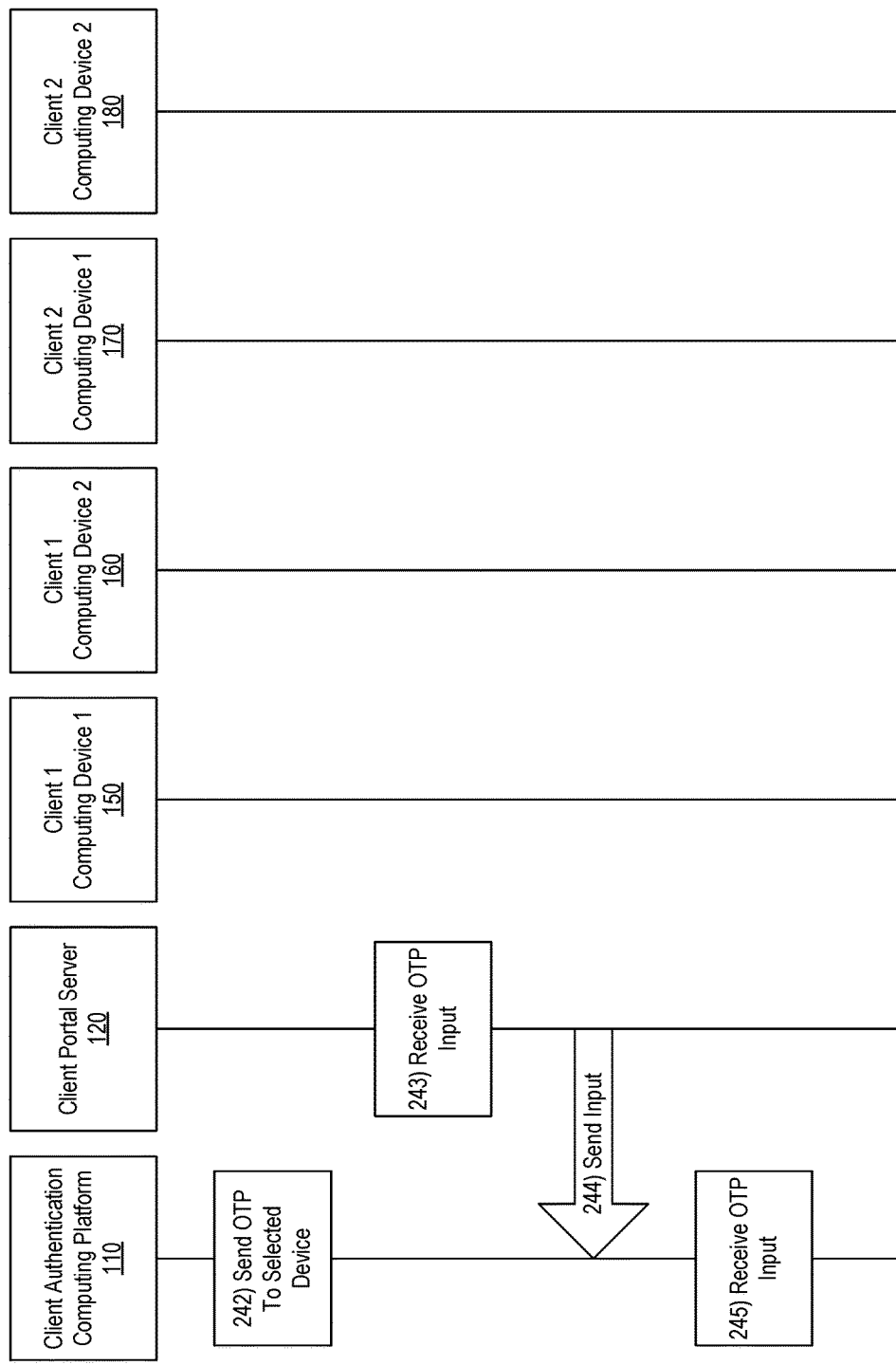

Referring to FIG. 2K, at step 242, client authentication computing platform 110 may send the one-time passcode to the selected device. For example, at step 242, client authentication computing platform 110 may send, via the communication interface (e.g., communication interface 115), and to the second registered device selected to receive the at least one one-time passcode, the second one-time passcode generated for the second registered device selected to receive the at least one one-time passcode.

At step 243, client portal server 120 may receive one-time passcode input. For example, at step 243, client portal server 120 may receive one-time passcode input via one or more user interfaces presented by client portal server 120, and such one-time passcode input may include the second one-time passcode generated by client authentication computing platform 110 for the second registered device selected to receive the at least one one-time passcode. At step 244, client portal server 120 may send the one-time passcode input to client authentication computing platform 110. At step 245, client authentication computing platform 110 may receive the one-time passcode input from client portal server 120. For example, at step 245, client authentication computing platform 110 may receive, via the communication interface (e.g., communication interface 115), and from the client portal server (e.g., client portal server 120), second one-time passcode input.

Referring to FIG. 2L, at step 246, client authentication computing platform 110 may validate the one-time passcode input received from client portal server 120. For example, at step 246, client authentication computing platform 110 may validate the second one-time passcode input received from the client portal server (e.g., client portal server 120). In validating the second one-time passcode input, client authentication computing platform 110 may, for example, compare the second one-time passcode input to the second one-time passcode generated by client authentication computing platform 110 for the second registered device selected to receive the at least one one-time passcode to confirm that the second one-time passcode input matches the second one-time passcode generated by client authentication computing platform 110 for the second registered device selected to receive the at least one one-time passcode and is therefore valid. If client authentication computing platform 110 determines that the second one-time passcode input does not match the second one-time passcode generated by client authentication computing platform 110 for the second registered device selected to receive the at least one one-time passcode and is therefore not valid, client authentication computing platform 110 may generate and/or send one or more error messages to client portal server 120 and/or one or more other devices. Such error messages may, for instance, prompt the user of client portal server 120 requesting access to the second user account to try entering the one-time passcode again, and if the user again provides invalid one-time passcode input, client authentication computing platform 110 may deny access to the second user account and/or the event sequence may end. If the second one-time passcode input is valid, the event sequence may continue as illustrated.

At step 247, client authentication computing platform 110 may generate a validation message. For example, at step 247, based on validating the second one-time passcode input received from the client portal server (e.g., client portal server 120), client authentication computing platform 110 may generate a second validation message directing the client portal server (e.g., client portal server 120) to provide the second user with access to the second user account. In some instances, in generating the second validation message directing the client portal server (e.g., client portal server 120) to provide the second user with access to the second user account, client authentication computing platform 110 may embed and/or otherwise include one or more tokens, certificates, and/or keys in the second validation message, and such tokens, certificates, and/or keys may be configured to enable and/or cause client portal server 120 to load and/or obtain user account information associated with the second user account from one or more other servers (which may, e.g., be associated with an organization, such as a financial institution, operating client authentication computing platform 110 and/or client portal server 120). For example, client authentication computing platform 110 may embed and/or otherwise include one or more tokens, certificates, and/or keys in the second validation message that enable and/or cause client portal server 120 to request, obtain, receive, and/or load financial account information associated with the second user account from one or more financial account management servers, so that client portal server 120 may subsequently present such financial account information via the client portal.

At step 248, client authentication computing platform 110 may send the validation message to client portal server 120. For example, at step 248, client authentication computing platform 110 may send, via the communication interface (e.g., communication interface 115), to the client portal server (e.g., client portal server 120), the second validation message directing the client portal server (e.g., client portal server 120) to provide the second user with access to the second user account.

At step 249, client authentication computing platform 110 may generate updated contextual login information. For example, after sending the second validation message directing the client portal server (e.g., client portal server 120) to provide the second user with access to the second user account, client authentication computing platform 110 may generate updated contextual login information for the second user account. The updated contextual login information for the second user account generated by client authentication computing platform 110 may, for example, be indicative of and/or generated based on the selected device being used to receive a one-time passcode when authenticating and/or providing access to the second user account. Client authentication computing platform 110 may, for example, use such updated contextual login information when processing a future login request for the second user account (e.g., to "remember" that the selected device was previously used to receive a one-time passcode for the user account while at a particular time and/or at a particular location).

At step 250, client authentication computing platform 110 may store the updated contextual login information. For example, at step 250, client authentication computing platform 110 may store the updated contextual login information for the second user account (e.g., in client authentication database 114).

Figure 7:
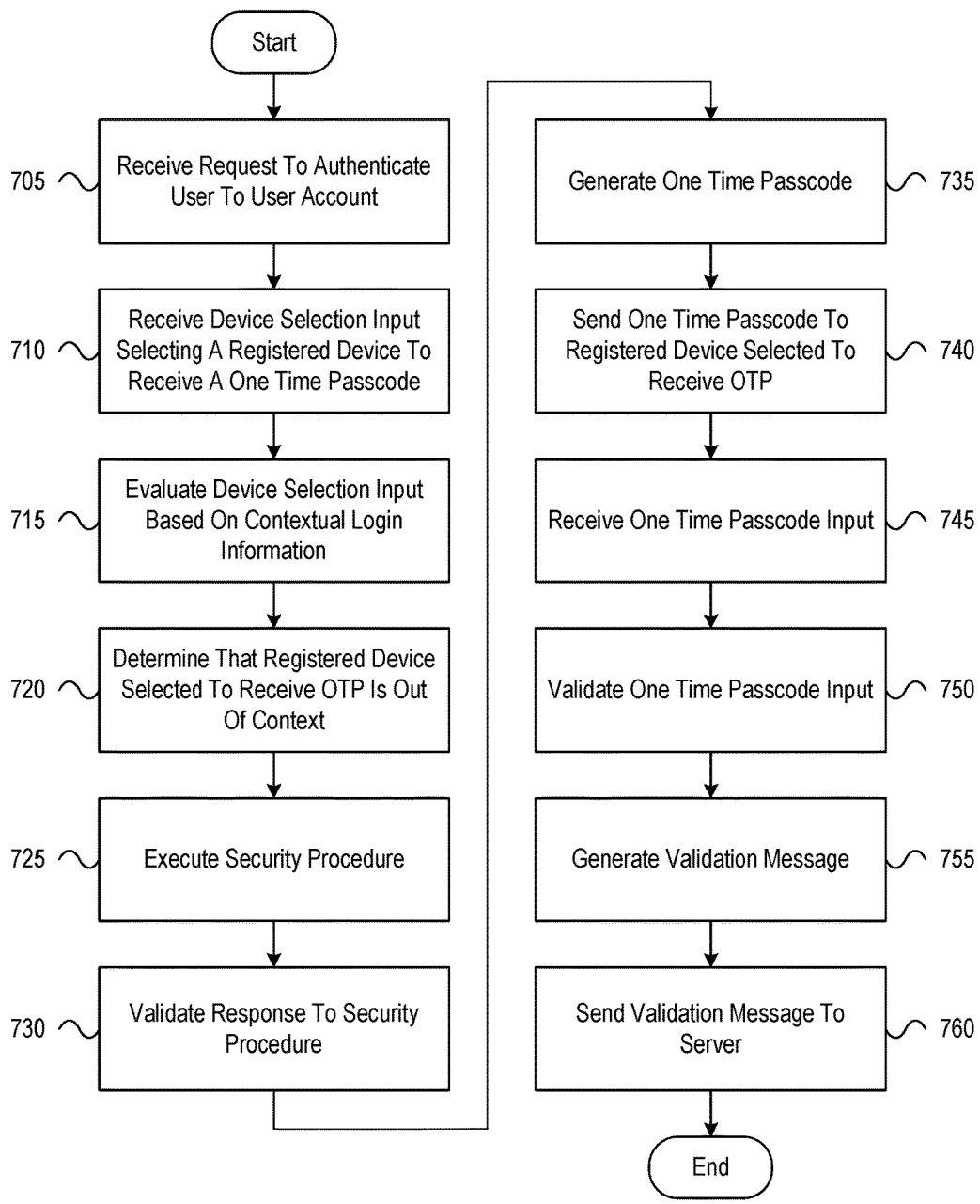
FIG. 7 depicts an illustrative method for preventing unauthorized access to secured information systems based on contextual login information in accordance with one or more example embodiments.

FIG. 7 depicts an illustrative method for preventing unauthorized access to secured information systems based on contextual login information in accordance with one or more example embodiments. Referring to FIG. 7, at step 705, a computing platform having at least one processor, a memory, and a communication interface may receive, via the communication interface, and from a client portal server, a request to authenticate a first user to a first user account associated with a client portal provided by the client portal server. At step 710, the computing platform may receive, via the communication interface, and from the client portal server, first device selection input selecting a first registered device to receive at least one one-time passcode. At step 715, the computing platform may evaluate the first device selection input based on first contextual login information associated with the first user account. At step 720, based on evaluating the first device selection input based on the first contextual login information associated with the first user account, the computing platform may determine that the first registered device selected to receive the at least one one-time passcode is out of context.

At step 725, based on determining that the first registered device selected to receive the at least one one-time passcode is out of context, the computing platform may execute a first security procedure. At step 730, the computing platform may validate a first response to the first security procedure. At step 735, based on validating the first response to the first security procedure, the computing platform may generate a first one-time passcode for the first registered device selected to receive the at least one one-time passcode. At step 740, the computing platform may send, via the communication interface, and to the first registered device selected to receive the at least one one-time passcode, the first one-time passcode generated for the first registered device selected to receive the at least one one-time passcode.

At step 745, the computing platform may receive, via the communication interface, and from the client portal server, first one-time passcode input. At step 750, the computing platform may validate the first one-time passcode input received from the client portal server. At step 755, based on validating the first one-time passcode input received from the client portal server, the computing platform may generate a first validation message directing the client portal server to provide the first user with access to the first user account. At step 760, the computing platform may send, via the communication interface, to the client portal server, the first validation message directing the client portal server to provide the first user with access to the first user account.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, and from a client portal server, a request to authenticate a first user to a first user account associated with a client portal provided by the client portal server;
   in response to the receiving of the request to authenticate the first user to the first user account associated with the client portal provided by the client portal server:
   generate a first device selection prompt directing the client portal server to prompt the first user to select a device to receive at least one one-time passcode; and
   send, via the communication interface, and to the client portal server, the first device selection prompt directing the client portal server to prompt the first user to select the device to receive the at least one one-time passcode;
   receive, via the communication interface, and from the client portal server, first device selection input selecting a first registered device to receive the at least one one-time passcode;
   evaluate the first device selection input based on first contextual login information associated with the first user account;
   based on the evaluating of the first device selection input based on the first contextual login information associated with the first user account, determine that the first registered device selected to receive the at least one one-time passcode is out of context, wherein the determining that the first registered device selected to receive the at least one one-time passcode is out of context comprises determining that the first registered device selected to receive the at least one one-time passcode is not an expected device to receive the at least one one-time passcode based on a current location of the first registered device, and wherein the determining that the first registered device selected to receive the at least one one-time passcode is out of context comprises determining that the first registered device selected to receive the at least one one-time passcode is not the expected device to receive the at least one one-time passcode based on the first contextual login information associated with the first user account indicating that the first registered device selected to receive the at least one one-time passcode has not been used to receive a one-time passcode at the current location of the first registered device within a predefined time period;
   based on the determining that the first registered device selected to receive the at least one one-time passcode is out of context, execute a first security procedure;
   validate a first response to the first security procedure;
   based on the validating of the first response to the first security procedure, generate a first one-time passcode for the first registered device selected to receive the at least one one-time passcode;
   send, via the communication interface, and to the first registered device selected to receive the at least one one-time passcode, the first one-time passcode generated for the first registered device selected to receive the at least one one-time passcode;
   receive, via the communication interface, and from the client portal server, first one-time passcode input;
   validate the first one-time passcode input received from the client portal server;
   based on the validating of the first one-time passcode input received from the client portal server, generate a first validation message directing the client portal server to provide the first user with access to the first user account; and send, via the communication interface, to the client portal server, the first validation message directing the client portal server to provide the first user with access to the first user account.

2. The computing platform of claim 1, wherein the memory stores additional computer-readable instructions that, when executed by the at least one processor, cause the computing platform to:
prior to receiving the request to authenticate the first user to the first user account associated with the client portal provided by the client portal server:
receive first device registration information for the first user account associated with the client portal provided by the client portal server; and
store the first device registration information for the first user account associated with the client portal provided by the client portal server,
wherein the first device registration information identifies the first registered device and a second registered device as authorized passcode recipients for the first user account associated with the client portal provided by the client portal server.

3. The computing platform of claim 1, wherein the evaluating of the first device selection input based on the first contextual login information associated with the first user account comprises evaluating a current time of day.

4. The computing platform of claim 1, wherein the evaluating of the first device selection input based on the first contextual login information associated with the first user account comprises evaluating a current location of the first registered device selected to receive the at least one one-time passcode.

5. The computing platform of claim 1, wherein the determining that the first registered device selected to receive the at least one one-time passcode is out of context comprises determining that the first registered device selected to receive the at least one one-time passcode is not an expected device to receive the at least one one-time passcode based on a current time of day.

6. The computing platform of claim 1,
wherein the executing of the first security procedure comprises:
generating a challenge question prompt directing the client portal server to prompt the first user to answer at least one challenge question; and
sending, to the client portal server, the challenge question prompt directing the client portal server to prompt the first user to answer at least one challenge question, and
wherein the validating of the first response to the first security procedure comprises validating a response to the at least one challenge question received from the first user.

7. The computing platform of claim 1,
wherein the executing of the first security procedure comprises generating and sending at least one biometric authentication prompt, and
wherein the validating of the first response to the first security procedure comprises validating a response to the at least one biometric authentication prompt.

8. The computing platform of claim 1,
wherein the executing of the first security procedure comprises generating and sending a one-time passcode prompt, and
wherein the validating of the first response to the first security procedure comprises validating a response to the one-time passcode prompt.

9. The computing platform of claim 1, wherein the memory stores additional computer-readable instructions that, when executed by the at least one processor, cause the computing platform to:
after sending the first validation message directing the client portal server to provide the first user with access to the first user account:
generate updated contextual login information for the first user account; and
store the updated contextual login information for the first user account.

10. The computing platform of claim 1, wherein the memory stores additional computer-readable instructions that, when executed by the at least one processor, cause the computing platform to:
receive, via the communication interface, and from the client portal server, a request to authenticate a second user to a second user account associated with the client portal provided by the client portal server;
receive, via the communication interface, and from the client portal server, second device selection input selecting a second registered device to receive at least one other one-time passcode;
evaluate the second device selection input based on second contextual login information associated with the second user account;
based on the evaluating of the second device selection input based on the second contextual login information associated with the second user account, determine that the second registered device selected to receive the at least one other one-time passcode is out of context;
based on the determining that the second registered device selected to receive the at least one other one-time passcode is out of context, execute a second security procedure;
validate a second response to the second security procedure;
based on the validating of the second response to the second security procedure, generate a second one-time passcode for the second registered device selected to receive the at least one other one-time passcode;
send, via the communication interface, and to the second registered device selected to receive the at least one other one-time passcode, the second one-time passcode generated for the second registered device selected to receive the at least one other one-time passcode;
receive, via the communication interface, and from the client portal server, second one-time passcode input;
validate the second one-time passcode input received from the client portal server;
based on the validating of the second one-time passcode input received from the client portal server, generate a second validation message directing the client portal server to provide the second user with access to the second user account; and
send, via the communication interface, to the client portal server, the second validation message directing the client portal server to provide the second user with access to the second user account.

11. The computing platform of claim 10, wherein the memory stores additional computer-readable instructions that, when executed by the at least one processor, cause the computing platform to:
prior to receiving the request to authenticate the second user to the second user account associated with the client portal provided by the client portal server:

receive second device registration information for the second user account associated with the client portal provided by the client portal server; and store the second device registration information for the second user account associated with the client portal provided by the client portal server, wherein the second device registration information identifies the second registered device and a third registered device as authorized passcode recipients for the second user account associated with the client portal provided by the client portal server.

12. The computing platform of claim 10, wherein the memory stores additional computer-readable instructions that, when executed by the at least one processor, cause the computing platform to:

in response to the receiving of the request to authenticate the second user to the second user account associated with the client portal provided by the client portal server:

generate a second device selection prompt directing the client portal server to prompt the second user to select a device to receive the at least one other one-time passcode; and send, via the communication interface, and to the client portal server, the second device selection prompt directing the client portal server to prompt the second user to select the device to receive the at least one other one-time passcode.

13. The computing platform of claim 10, wherein the evaluating of the second device selection input based on the second contextual login information associated with the second user account comprises evaluating a current time of day.

14. The computing platform of claim 10, wherein the evaluating of the second device selection input based on the second contextual login information associated with the second user account comprises evaluating a current location of the second registered device selected to receive the at least one other one-time passcode.

15. The computing platform of claim 10, wherein the determining that the second registered device selected to receive the at least one other one-time passcode is out of context comprises determining that the second registered device selected to receive the at least one other one-time passcode is not an expected device to receive the at least one other one-time passcode based on a current time of day.

16. The computing platform of claim 10, wherein the determining that the second registered device selected to receive the at least one other one-time passcode is out of context comprises determining that the second registered device selected to receive the at least one other one-time passcode is not an expected device to receive the at least one other one-time passcode based on a current location of the second registered device.

17. The computing platform of claim 10, wherein the executing of the second security procedure comprises:

generating a challenge question prompt directing the client portal server to prompt the second user to answer at least one challenge question; and sending, to the client portal server, the challenge question prompt directing the client portal server to prompt the second user to answer at least one challenge question, and wherein the validating of the second response to the second security procedure comprises validating a response to the at least one challenge question received from the second user.

18. The computing platform of claim 10, wherein the executing of the second security procedure comprises generating and sending at least one biometric authentication prompt, and wherein the validating of the second response to the second security procedure comprises validating a response to the at least one biometric authentication prompt.

19. The computing platform of claim 10, wherein the executing of the second security procedure comprises generating and sending a one-time passcode prompt, and wherein the validating of the second response to the second security procedure comprises validating a response to the one-time passcode prompt.

20. The computing platform of claim 10, wherein the memory stores additional computer-readable instructions that, when executed by the at least one processor, cause the computing platform to:

after sending the second validation message directing the client portal server to provide the second user with access to the second user account:

generate updated contextual login information for the second user account; and store the updated contextual login information for the second user account.

21. A method, comprising:

at a computing platform comprising at least one processor, memory, and a communication interface:

receiving, by the at least one processor, via the communication interface, and from a client portal server, a request to authenticate a first user to a first user account associated with a client portal provided by the client portal server;

in response to the receiving of the request to authenticate the first user to the first user account associated with the client portal provided by the client portal server:

generating, by the at least one processor, a first device selection prompt directing the client portal server to prompt the first user to select a device to receive at least one one-time passcode; and sending, by the at least one processor, via the communication interface, and to the client portal server, the first device selection prompt directing the client portal server to prompt the first user to select the device to receive the at least one one-time passcode;

receiving, by the at least one processor, via the communication interface, and from the client portal server, first device selection input selecting a first registered device to receive the at least one one-time passcode;

evaluating, by the at least one processor, the first device selection input based on first contextual login information associated with the first user account;

based on the evaluating of the first device selection input based on the first contextual login information associated with the first user account, determining, by the at least one processor, that the first registered device selected to receive the at least one one-time passcode is out of context, wherein the determining that the first registered device selected to receive the at least one one-time passcode is out of context comprises determining that the first registered device selected to receive the at least one one-time passcode is not an expected device to receive the at least one one-time passcode based on a current location of the first registered device, and wherein the determining that the first registered device selected to receive the at least one one-time passcode is out of context comprises determining that the first registered device selected to receive the at least one one-time passcode is not the expected device to receive the at least one one-time passcode based on the first contextual login information associated with the first user account indicating that the first registered device selected to receive the at least one one-time passcode has not been used to receive a one-time passcode at the current location of the first registered device within a predefined time period;

based on the determining that the first registered device selected to receive the at least one one-time passcode is out of context, executing, by the at least one processor, a first security procedure;

validating, by the at least one processor, a first response to the first security procedure;

based on the validating of the first response to the first security procedure, generating, by the at least one processor, a first one-time passcode for the first registered device selected to receive the at least one one-time passcode;

sending, by the at least one processor, via the communication interface, and to the first registered device selected to receive the at least one one-time passcode, the first one-time passcode generated for the first registered device selected to receive the at least one one-time passcode;

receiving, by the at least one processor, via the communication interface, and from the client portal server, first one-time passcode input;

validating, by the at least one processor, the first one-time passcode input received from the client portal server;

based on the validating of the first one-time passcode input received from the client portal server, generating, by the at least one processor, a first validation message directing the client portal server to provide the first user with access to the first user account; and sending, by the at least one processor, via the communication interface, to the client portal server, the first validation message directing the client portal server to provide the first user with access to the first user account.

22. One or more non-transitory computer-readable media storing instructions that, when executed by a computing platform comprising at least one processor, memory, and a communication interface, cause the computing platform to:

receive, via the communication interface, and from a client portal server, a request to authenticate a first user to a first user account associated with a client portal provided by the client portal server;

in response to the receiving of the request to authenticate the first user to the first user account associated with the client portal provided by the client portal server:

generate a first device selection prompt directing the client portal server to prompt the first user to select a device to receive at least one one-time passcode; and send, via the communication interface, and to the client portal server, the first device selection prompt directing the client portal server to prompt the first user to select the device to receive the at least one one-time passcode;

receive, via the communication interface, and from the client portal server, first device selection input selecting a first registered device to receive the at least one one-time passcode;

evaluate the first device selection input based on first contextual login information associated with the first user account;

based on the evaluating of the first device selection input based on the first contextual login information associated with the first user account, determine that the first registered device selected to receive the at least one one-time passcode is out of context, wherein the determining that the first registered device selected to receive the at least one one-time passcode is out of context comprises determining that the first registered device selected to receive the at least one one-time passcode is not an expected device to receive the at least one one-time passcode based on a current location of the first registered device, and wherein the determining that the first registered device selected to receive the at least one one-time passcode is out of context comprises determining that the first registered device selected to receive the at least one one-time passcode is not the expected device to receive the at least one one-time passcode based on the first contextual login information associated with the first user account indicating that the first registered device selected to receive the at least one one-time passcode has not been used to receive a one-time passcode at the current location of the first registered device within a predefined time period;

based on the determining that the first registered device selected to receive the at least one one-time passcode is out of context, execute a first security procedure;

validate a first response to the first security procedure;

based on the validating of the first response to the first security procedure, generate a first one-time passcode for the first registered device selected to receive the at least one one-time passcode;

send, via the communication interface, and to the first registered device selected to receive the at least one one-time passcode, the first one-time passcode generated for the first registered device selected to receive the at least one one-time passcode;

receive, via the communication interface, and from the client portal server, first one-time passcode input;

validate the first one-time passcode input received from the client portal server;

based on the validating of the first one-time passcode input received from the client portal server, generate a first validation message directing the client portal server to provide the first user with access to the first user account; and send, via the communication interface, to the client portal server, the first validation message directing the client portal server to provide the first user with access to the first user account.

* * * * *